US011598531B2

(12) United States Patent
Ruben

(10) Patent No.: US 11,598,531 B2
(45) Date of Patent: Mar. 7, 2023

(54) ELECTRONIC STOVE AND UNIVERSAL POWER SUPPLY

(71) Applicant: Murray Ruben, Santa Barbara, CA (US)

(72) Inventor: Murray Ruben, Santa Barbara, CA (US)

( * ) Notice: Subject to any disclaimer, the term of this patent is extended or adjusted under 35 U.S.C. 154(b) by 681 days.

(21) Appl. No.: 16/576,383

(22) Filed: Sep. 19, 2019

(65) Prior Publication Data

US 2020/0096204 A1 Mar. 26, 2020

Related U.S. Application Data

(60) Provisional application No. 62/734,220, filed on Sep. 20, 2018.

(51) Int. Cl.
*F24C 7/10* (2021.01)
*F24C 7/08* (2006.01)
(Continued)

(52) U.S. Cl.
CPC .......... *F24C 7/088* (2013.01); *A47G 19/2288* (2013.01); *A47G 23/04* (2013.01); *A47J 31/005* (2013.01); *F24C 3/14* (2013.01); *F24C 7/10* (2013.01); *F24H 1/06* (2013.01); *G05B 19/02* (2013.01); *A47J 36/2472* (2013.01); *A47J 36/2483* (2013.01); *F24C 7/081* (2013.01);
(Continued)

(58) Field of Classification Search
CPC .......... F24C 7/088; F24C 7/081; F24C 7/006; F24C 7/008; F24C 7/105; F24C 7/10; F24C 3/14; A47J 31/005; A47J 36/2472; A47J 36/2483; A47J 36/26; F24H 1/06; A47G 19/2288; A47G 23/04; H05B 1/0244; H05B 1/0252; H05B 1/0269
USPC ............................ 126/275 E, 90 A; 122/4 A
See application file for complete search history.

(56) References Cited

U.S. PATENT DOCUMENTS 4,704,954 A * 11/1987 Mollenhoff ........... A47J 31/005
99/279
4,801,782 A 1/1989 Ineson
(Continued)

FOREIGN PATENT DOCUMENTS

CA 2222260 A1 * 2/1998 ............ A47J 31/005
CN 201429151 Y 3/2010
(Continued)

*Primary Examiner* — Steven B McAllister
*Assistant Examiner* — Daniel E. Namay
(74) *Attorney, Agent, or Firm* — Felix L. Fischer

(57) ABSTRACT

An electronic stove incorporates a cylindrical outer shell and a concentric copper heater core. A foil heater surrounds the copper heater core and a heater control PCB carried in the outer shell is connected to the foil heater. A battery assembly has a cylindrical second outer shell carrying a battery pack. A power controller carried in the second outer shell is connected to the battery pack. A connector carriage is engaged between the battery assembly and cylindrical outer shell, extending through the shell of the battery assembly and received in the cylindrical outer shell aligned proximate a lower surface of the first outer shell whereby the lower surfaces of the first outer shell and the second outer shell are in planar alignment. A first contact set of a connector is connected to the heater control PCB. A second contact is connected to the power controller.

10 Claims, 25 Drawing Sheets

(51) Int. Cl.
  *G05B 19/02* (2006.01)
  *F24C 3/14* (2021.01)
  *A47J 31/00* (2006.01)
  *F24H 1/06* (2022.01)
  *A47G 19/22* (2006.01)
  *A47G 23/04* (2006.01)
  *A47J 36/24* (2006.01)
  *H05B 1/02* (2006.01)

(52) U.S. Cl.
  CPC .... *G05B 2219/2643* (2013.01); *H05B 1/0244* (2013.01)

(56) References Cited

U.S. PATENT DOCUMENTS

| | | | | |
|---|---|---|---|---|
| 5,063,838 A | * | 11/1991 | Matuschek | A47J 31/005 426/112 |
| 5,159,873 A | * | 11/1992 | Weeden | A47J 31/005 99/305 |
| 5,508,494 A | * | 4/1996 | Sarris | A47J 31/005 219/385 |
| 5,680,108 A | | 10/1997 | Daniell et al. | |
| 2007/0221067 A1 | * | 9/2007 | Scelza | A47J 31/005 99/279 |
| 2011/0103779 A1 | * | 5/2011 | Baston | A47J 31/106 392/444 |
| 2013/0312617 A1 | * | 11/2013 | Toporovsky | A47J 31/005 99/280 |
| 2014/0165607 A1 | | 6/2014 | Alexander | |
| 2015/0182059 A1 | * | 7/2015 | Richardson | A47J 31/0576 99/302 R |
| 2015/0250346 A1 | * | 9/2015 | Baston | A47J 41/0038 99/316 |
| 2016/0345772 A1 | * | 12/2016 | Warren | A47J 31/405 |
| 2017/0119196 A1 | * | 5/2017 | Chen | A47J 31/0605 |
| 2018/0078077 A1 | * | 3/2018 | Su | A47J 31/407 |
| 2018/0168378 A1 | | 6/2018 | Alexander | |
| 2019/0090680 A1 | * | 3/2019 | Urciuoli | A47J 31/407 |

FOREIGN PATENT DOCUMENTS

| | | | | |
|---|---|---|---|---|
| CN | 106618246 A | | 5/2017 | |
| CN | 206560333 U | * | 10/2017 | ............. A47J 31/40 |
| EP | 1656866 A1 | | 5/2006 | |
| GB | 2289208 A | * | 11/1995 | ............. A47J 31/005 |
| GB | 2374274 A | * | 10/2002 | ......... A47J 31/0053 |
| KR | 20170059100 A | | 5/2017 | |
| WO | WO-2007112096 A2 | * | 10/2007 | ........... A47J 31/005 |
| WO | WO-2017136311 A1 | * | 8/2017 | ........... A47J 31/005 |
| WO | WO-2018222191 A1 | * | 12/2018 | ............. A47J 31/04 |

* cited by examiner

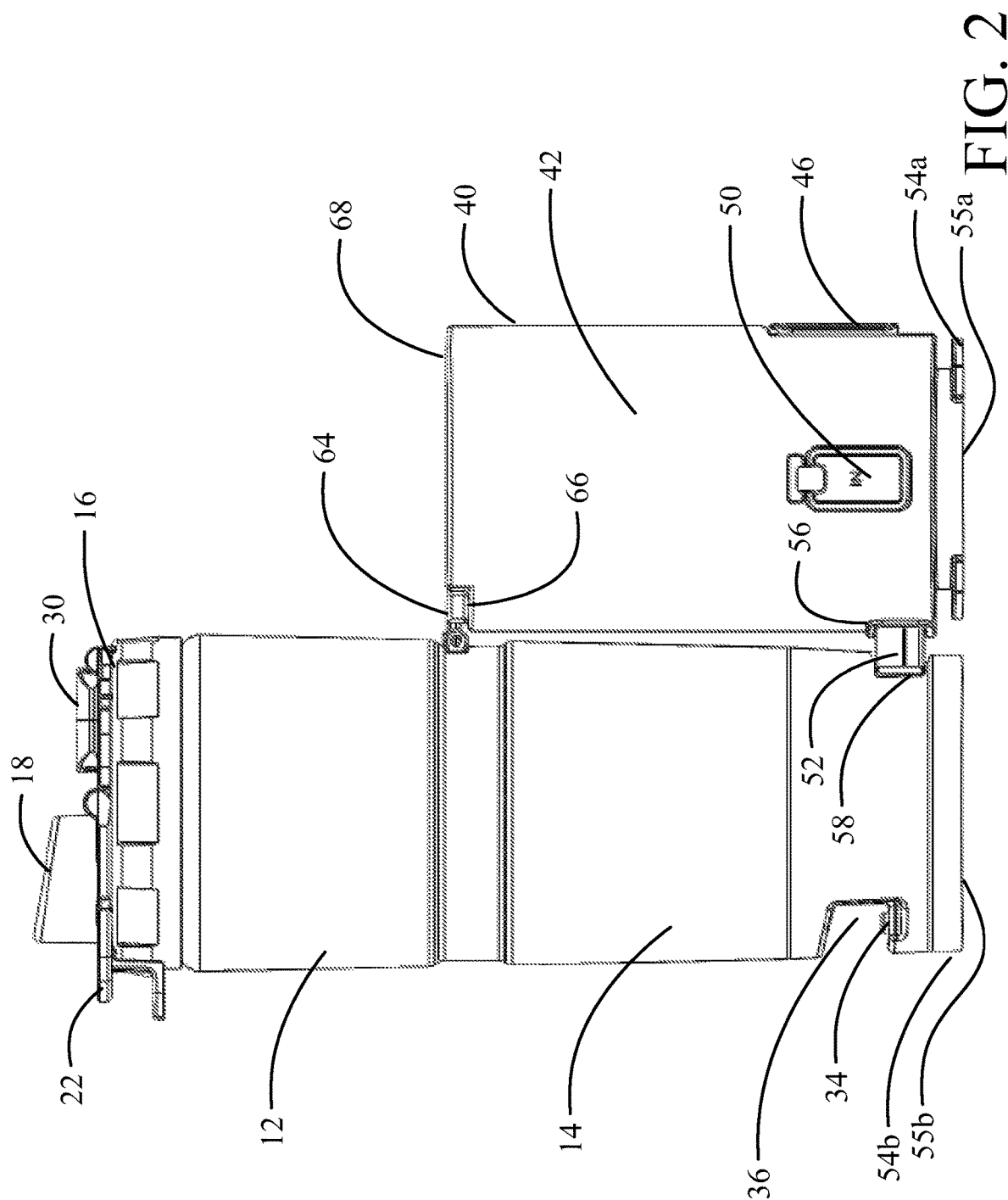

ELECTRONIC STOVE AND UNIVERSAL POWER SUPPLY

REFERENCE TO RELATED APPLICATIONS

This application claims priority of U.S. provisional application Ser. No. 62/734,220 filed on Sep. 20, 2018 entitled ELECTRONIC STOVE AND UNIVERSAL POWER SUPPLY, the disclosure of which is incorporated herein by reference.

BACKGROUND

Field

This invention relates generally to the portable cooking systems and more particularly to an integrated heating vessel and battery assembly.

Description of the Related Art

Camping or backpacking stoves are highly useful for remote operation when other cooking facilities are not available. Propane or butane heater systems are available which provide adequate heat to boil water or generally heat meals with high liquid content. However, open flame is always potentially hazardous.

It is therefore desirable to provide a device which provides capability for heating liquids and high liquid content meals which is easily portable but does not employ a flame heater.

SUMMARY

The embodiments disclosed herein overcome the shortcomings of the prior art by providing an electronic stove (E-stove) incorporating a liquid container and heater system (LCHS) having a substantially cylindrical outer shell and a copper heater core concentrically received in the outer shell. A foil heater is concentrically received around the copper heater core and a heater control PCB is carried in the outer shell and operationally connected to the foil heater. A battery assembly having a substantially cylindrical second outer shell and a battery pack carried within the second shell. A power controller printed circuit board (PCPCB) is carried in the second outer shell and operationally connected to the battery pack. A connector carriage, extendable from the battery assembly proximate a lower surface second outer shell is adapted to be engaged between the battery assembly and the liquid container and heating system in an operating mode. The connector carriage removably extends through a first aperture in the second cylindrical shell of the battery assembly and is received through a second aperture in the first cylindrical shell of the liquid container and heating system. The second aperture is proximate a lower surface of the first outer shell and aligned with the first aperture whereby the lower surface of the first outer shell and lower surface of the second outer shell are in planar alignment. A first contact set of a connector is carried by and operationally connected to the heater control PCB. A second contact set of the connector is carried by the connector carriage and operationally connected to the power controller printed circuit board.

BRIEF DESCRIPTION OF THE DRAWINGS

These and other features and advantages of the present invention will be better understood by reference to the following detailed description of exemplary embodiments when considered in connection with the accompanying drawings wherein:

FIG. 2 is a left side view of the E-stove in the operating mode;

FIGS. 10-1-10-2 are a flow chart of operation of the PCPCB;

FIGS. 12-1-12-3 are a flow chart of the operation of the heater control PCB.

DETAILED DESCRIPTION

Figure 1A:
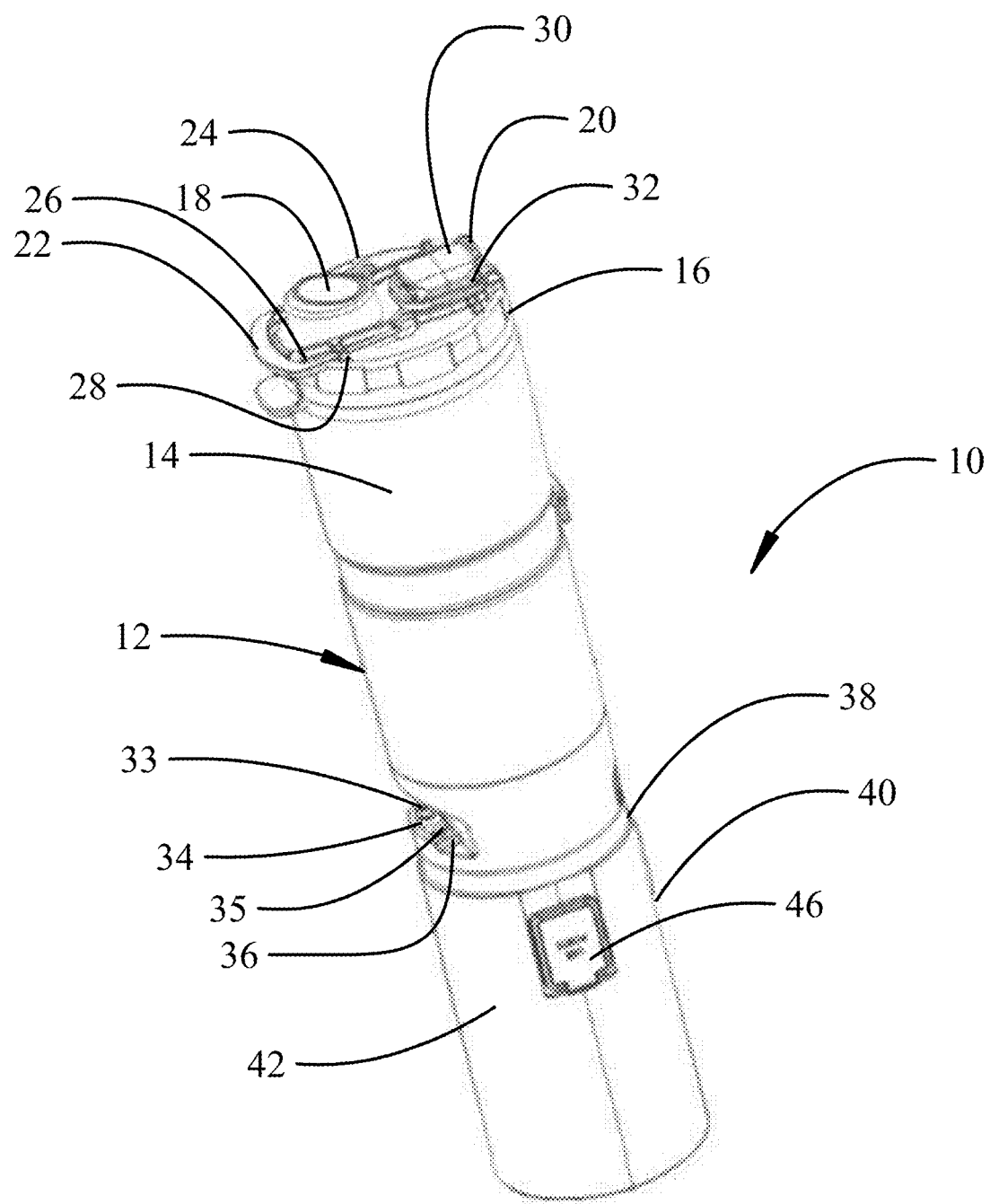
FIGS. 1A-1D are pictorial representations of the E-stove in the non-operating mode.

Implementations shown in the drawings and described herein provide a battery powered electronic stove ("E-stove") with an integrated liquid container and heating system and a battery assembly both have a substantially cylindrical form factor allowing storage in a water bottle holder in a backpack and in a second operating mode with the battery system laterally engaged to the liquid container for increased standing stability while providing power to the heating system. The heating system and battery assembly have an rotatable connector which allows attachment in an axial mode for other storage situations like boats, cars, airplanes or at home where maintaining connection of the two units other than in the operating mode is desirable.

Figure 1B:
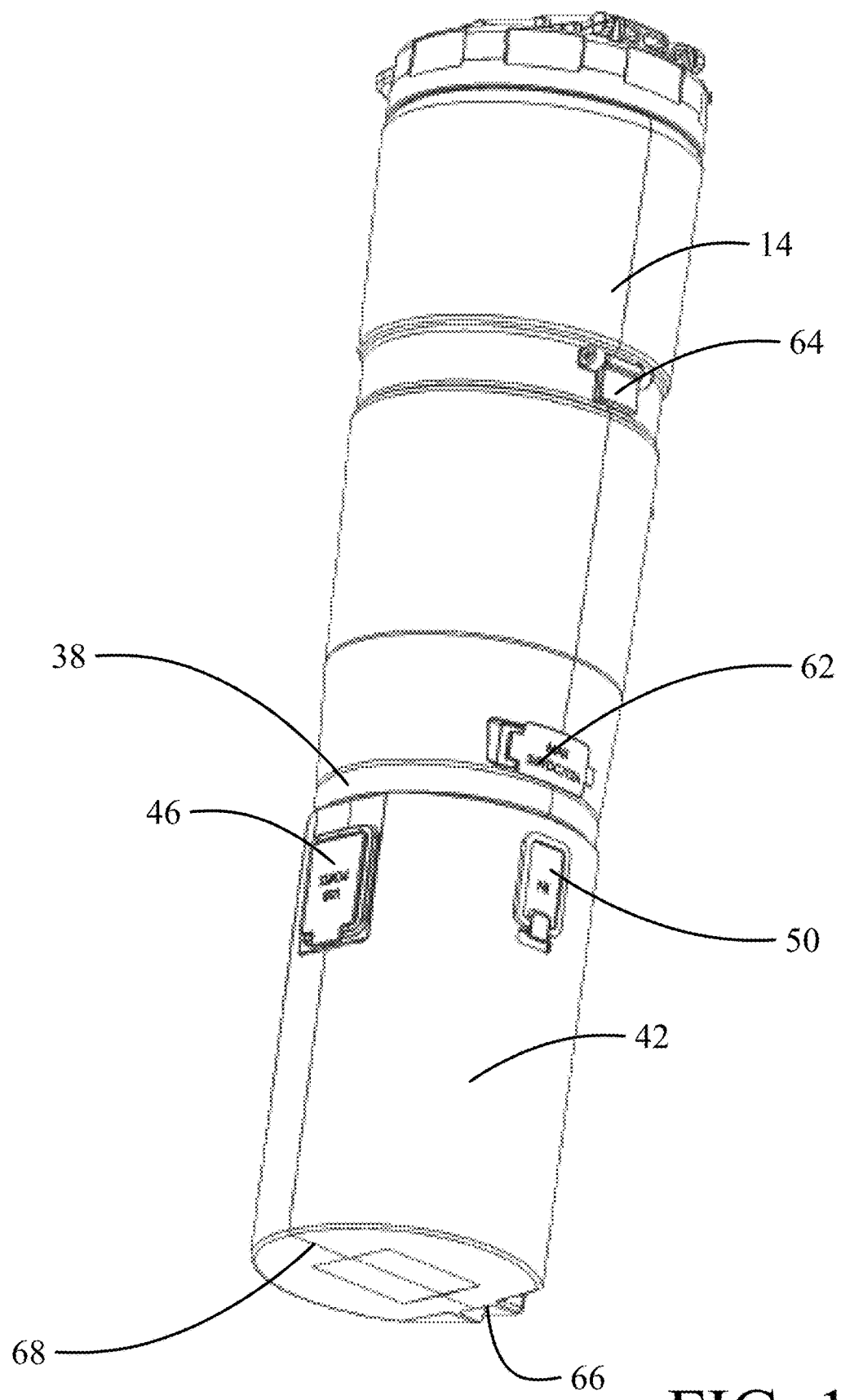
Figure 1C:
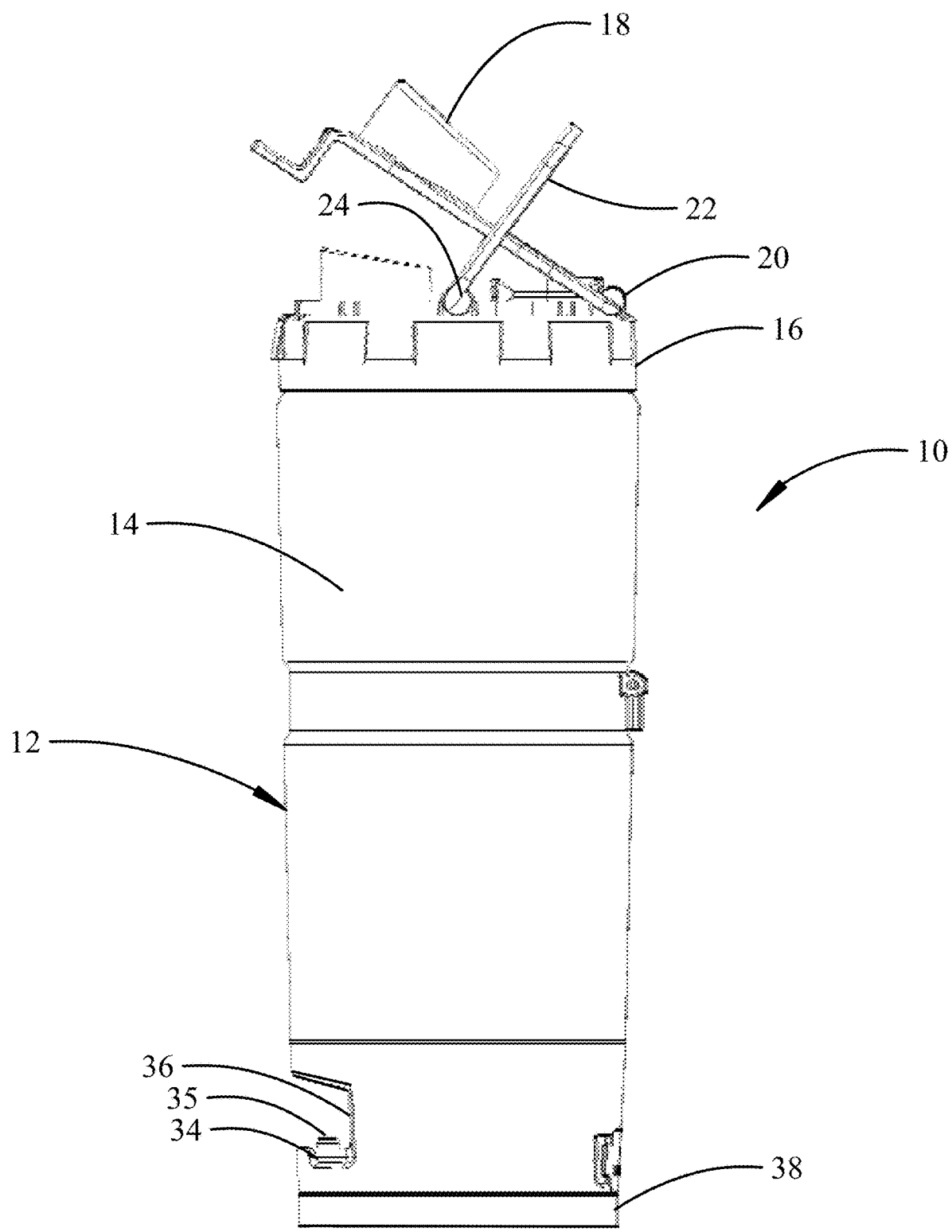

Referring to the drawings, FIGS. 1A and 1B show an E-stove 10 in the first non-operating storage mode. A liquid container and heating system 12 has a first cylindrical shell 14 with a screw on cover 16. The cover 16 may incorporate a flip cap 18 which is rotatable about a first hinge 20. A carabiner clip 22 is rotatable about a second hinge 24. In a closed position (best seen in FIG. 1A) the carabiner clip 22 overlays the flip cap 18 and legs 26 of the carabiner clip are engaged in detents 28 locking the carabiner clip and flip cap in the closed position. FIG. 1C shows the flip cap 18 and carabiner clip 22 in an open position. An actuator handle 30 for a stirrer, which will be described in greater detail subsequently, is received through a pocket 32 in the flip cap 18. A heater control and indicator panel 34 is provided in a recess 36 proximate the bottom of the first cylindrical shell 14. In the exemplary implementations "buttons" 33 and 35 are molded into a clear rubber membrane that fits into a pocket within the raised section of the control and indicator panel 34. A tri color LED 1116 (as described subsequently with respect to FIG. 11) is positioned behind the membrane and used to convey information regarding the heater settings and heater status by varying color and flash rates of the LED.

A battery assembly 40 has a second cylindrical shell 42 having a diameter substantially identical to the first cylindrical shell 14 and is axially engaged to the first cylindrical shell with a rotatable connector 38 which will be described in greater detail subsequently. The battery assembly 40 includes a battery pack 44 (shown in FIGS. 3A and 3B) and has USB power output ports 45 behind an openable cover 46. A universal charger power input jack 48 (seen in FIG. 3B) is housed behind a second openable cover 50.

In the non-operating mode, with the battery assembly 40 engaged to the liquid container and heating system 12 in axial alignment using the rotatable connector 38, the cylindrical form factor provided allows the entire E-stove 10 to be connected to maintain the elements together.

Figure 1D:
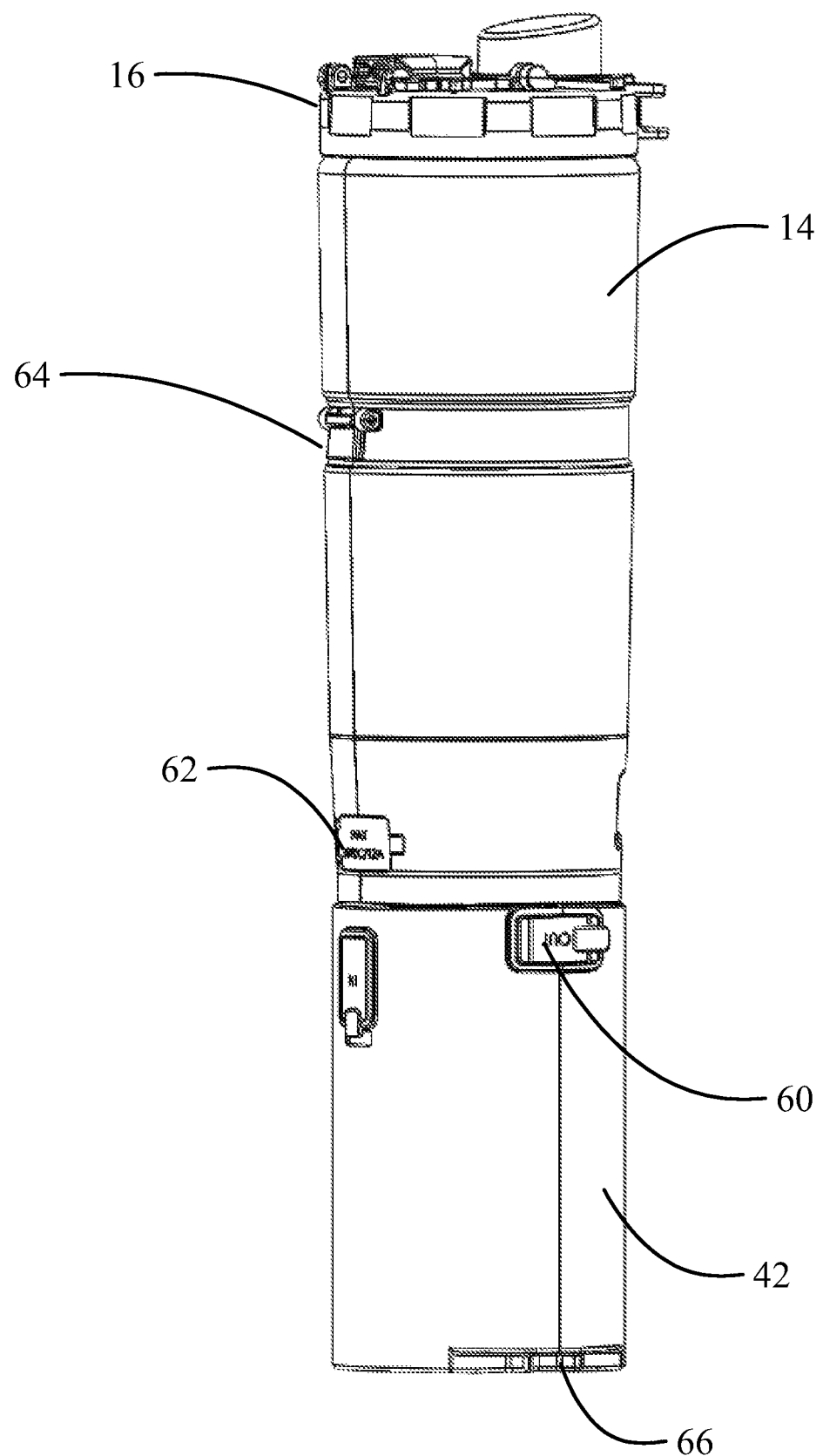
Figures 1, 10:
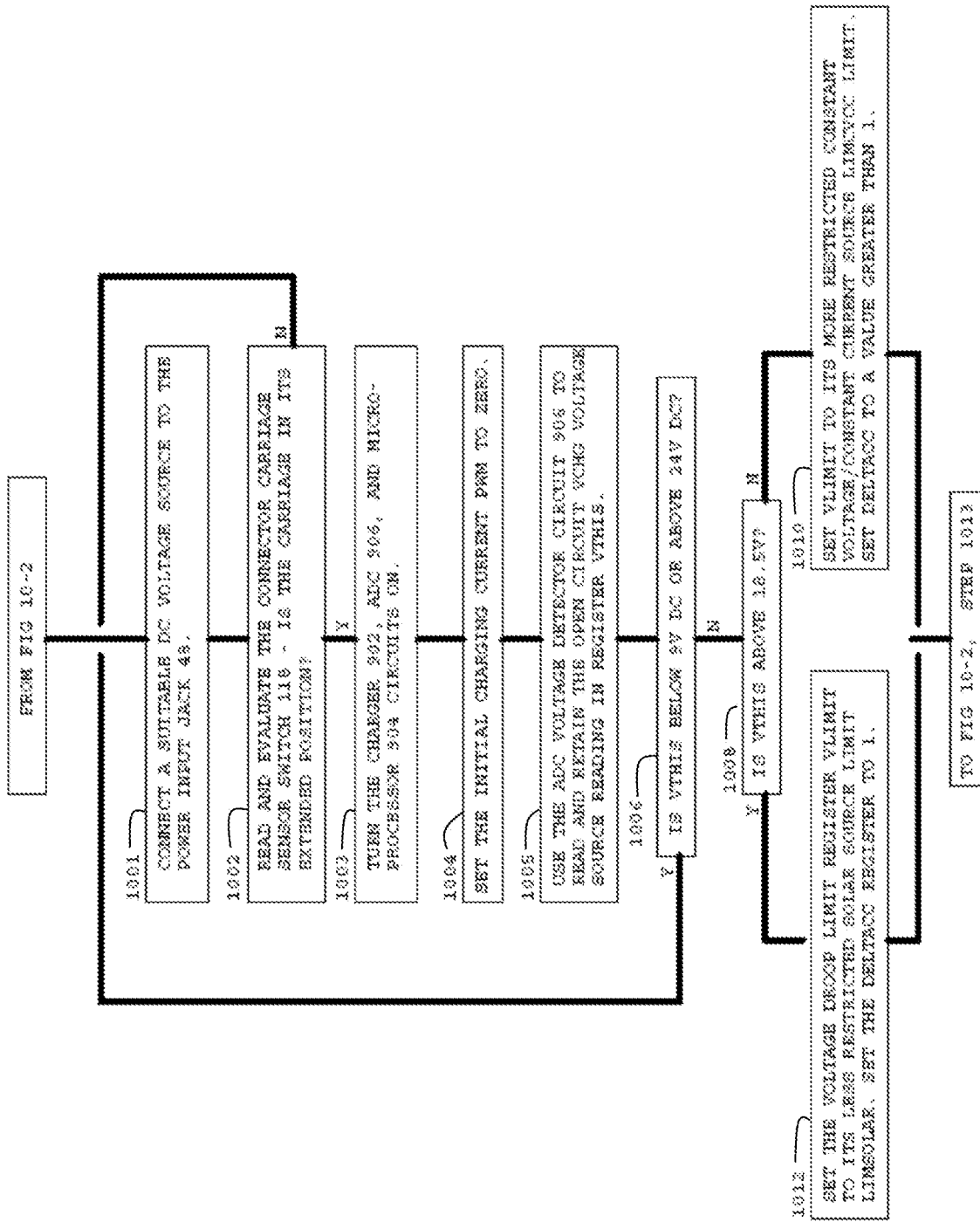
Figures 2, 10:
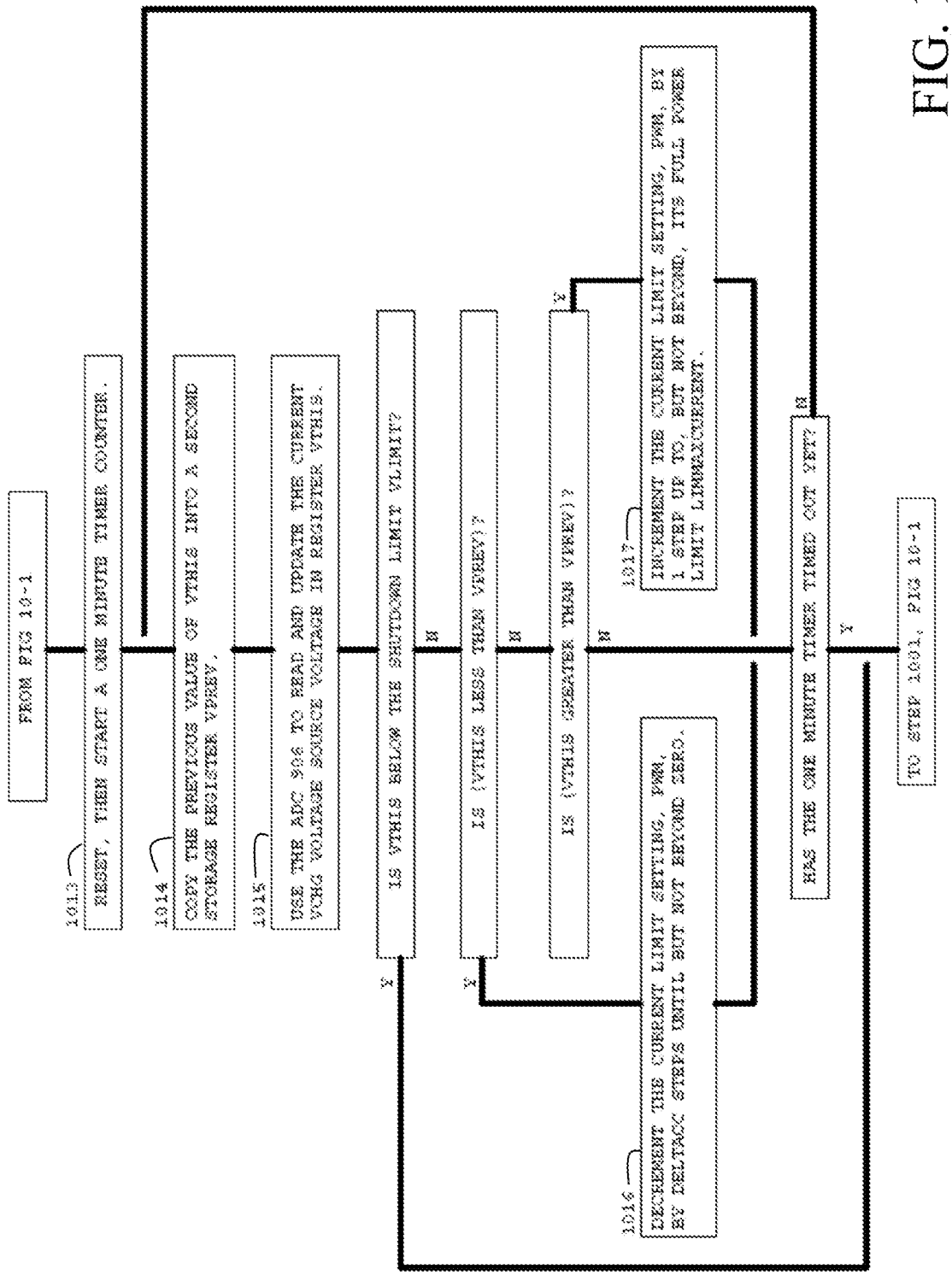

The battery assembly 40 is removable from the rotatable connector 38 for independent unit storage and for lateral engagement to the liquid container and heating system 12 to place the E-stove 10 in the operating mode as shown in FIG. 2. A connector carriage 52, extendable from the battery assembly 40 proximate a first moiety 54a of the rotatable connector 38, is engaged between the battery assembly 40 and the liquid container and heating system 12. The connector carriage 52 extends through a first aperture 56 in the second cylindrical shell 42 of the battery assembly 40 and is received through a second aperture 58 in the first cylindrical shell 14 of the liquid container and heating system 12 proximate a second moiety 54b of the rotatable connector 38. In the operating mode, an outer surface 55a of the first moiety 54a and outer surface 55b of the second moiety 54a are in planer alignment to allow the E-stove to stand on a flat surface. The first aperture 56 and second aperture 58 are closed with plugs 60 and 62, respectively, (seen in FIGS. 1B and 1D) in the non-operating mode. A battery lock clip 64 is rotatably extendable from the first cylindrical shell 14 and is received in a locking recess 66 in the second cylindrical shell 42 distal from the first moiety 54a and proximate a free surface 68 of the second cylindrical shell 42. The connector carriage 52 and the battery lock clip 64 firmly engage the battery assembly 40 and the liquid container and heating system 12 in the operating mode. In this configuration, the battery assembly 40 provides a stabilizer for the liquid container and heating system 12 allowing the E-stove 10 to stand with high stability without additional support in the operating mode.

Figure 3A:
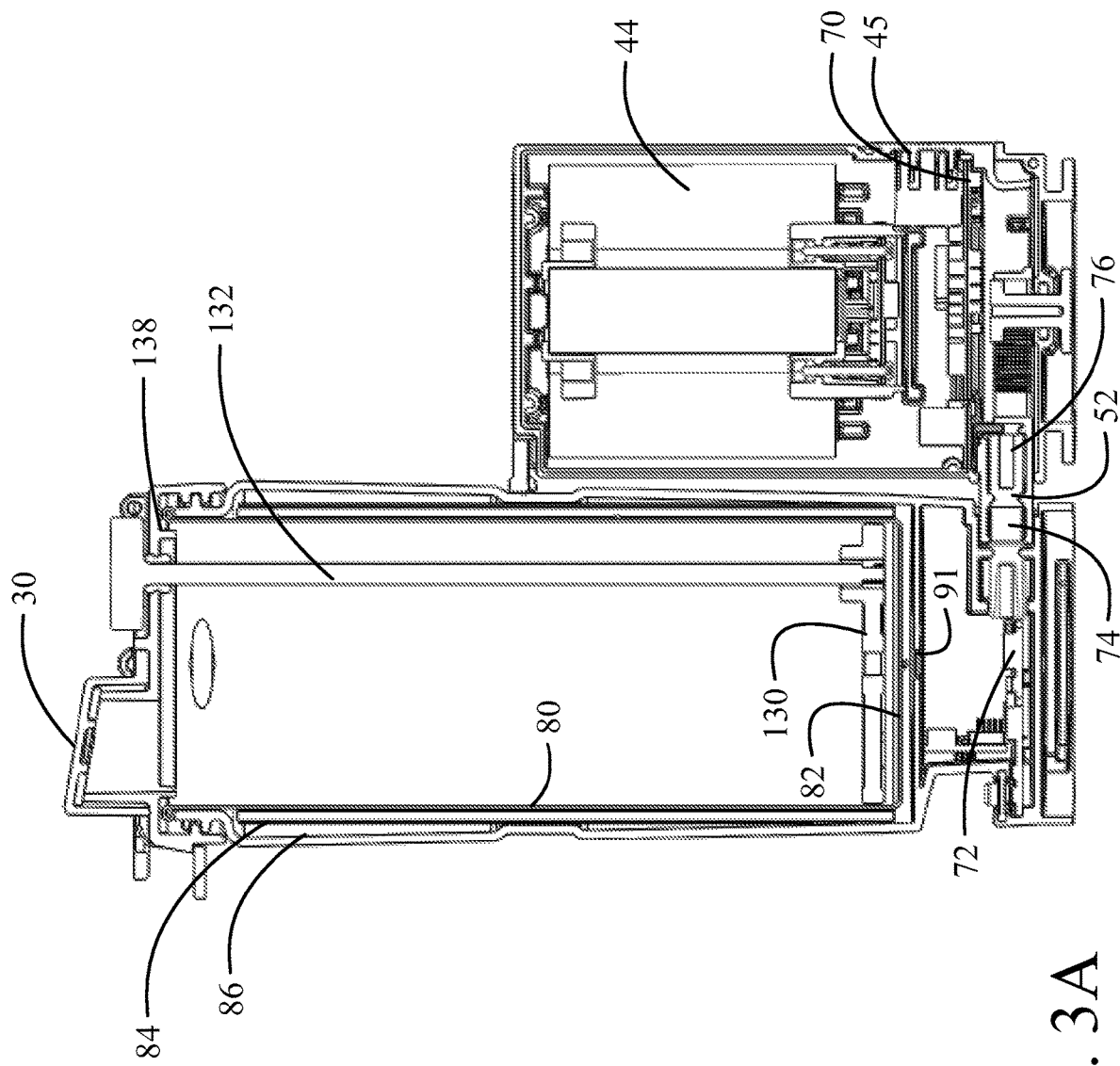
FIG. 3A is a side section view showing internal components of the liquid container and heating system (LCHS) and battery system.
Figure 3B:
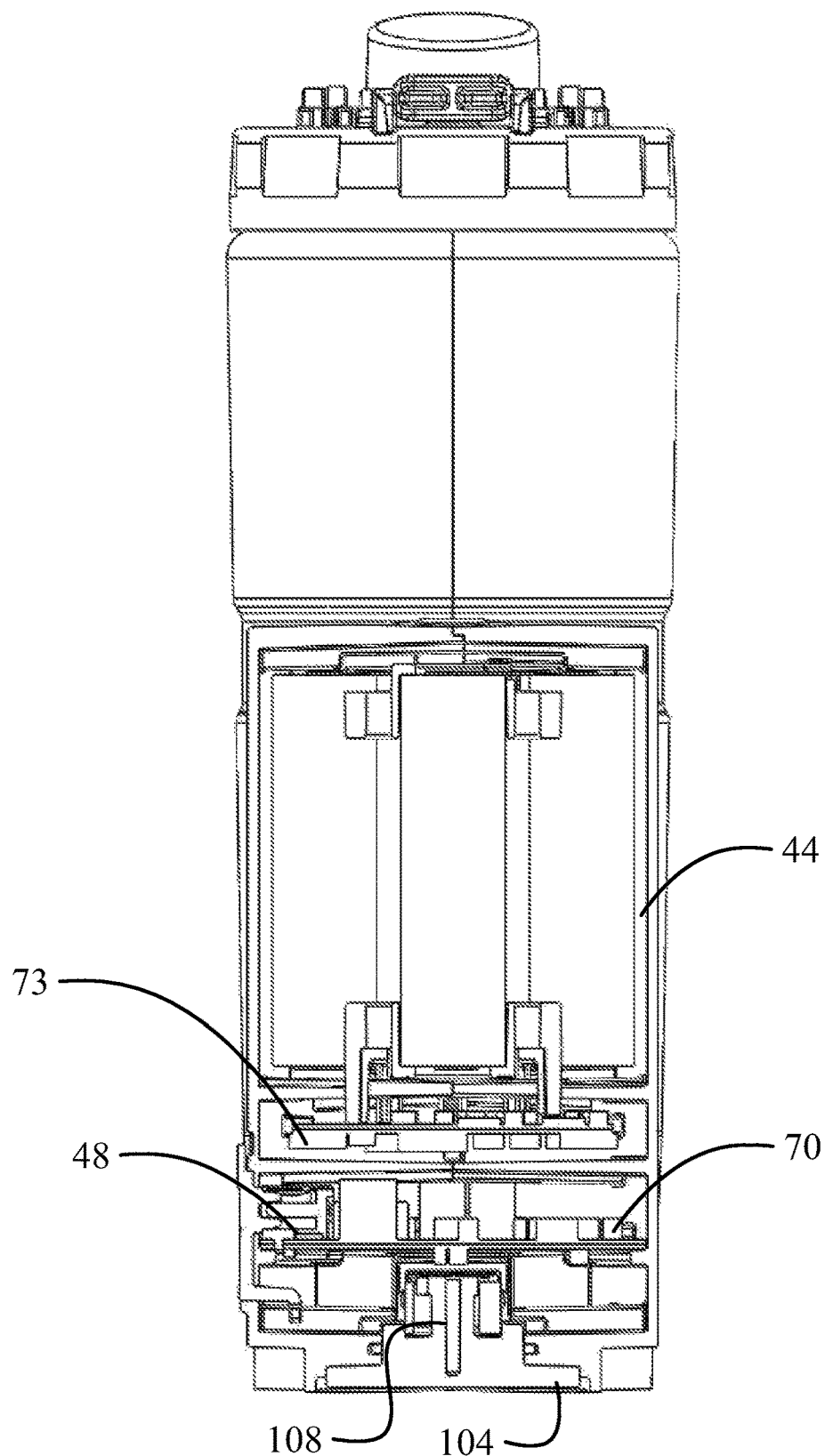
FIG. 3B is an end view of the E-stove in the operating mode sectioned through the battery assembly.

As seen in FIGS. 3A and 3B, the battery assembly 40 incorporates a universal power controller printed circuit board (PCPCB) 70 interconnected to the battery pack 44 and the universal power input jack 48. The PCPCB 70 is connected through the connector carriage 52 to a heater control PCB 72 in the LCHS 12. For the exemplary implementation, an Anderson connector having a first contact set 74 carried on the heater control PCB and the second contact set 76 carried in the connector carriage 52 provides both electrical power and mechanical interlock.

In the exemplary embodiment, the battery cells in battery pack 44 are arranged around a pair of spacers that locate eight cells on a circular pattern with a ninth cell in the center. This produces nominal 34V output under load in a very compact, circular shape. The spacers have access holes that allow the cell tap wires to pass thru them to be attached to the Battery Protection PCB (BPPCB) 73 that is screwed into a bottom spacer. This configuration allows the battery pack and BPPCB to be fabricated and shipped as an assembly.

Figure 4:
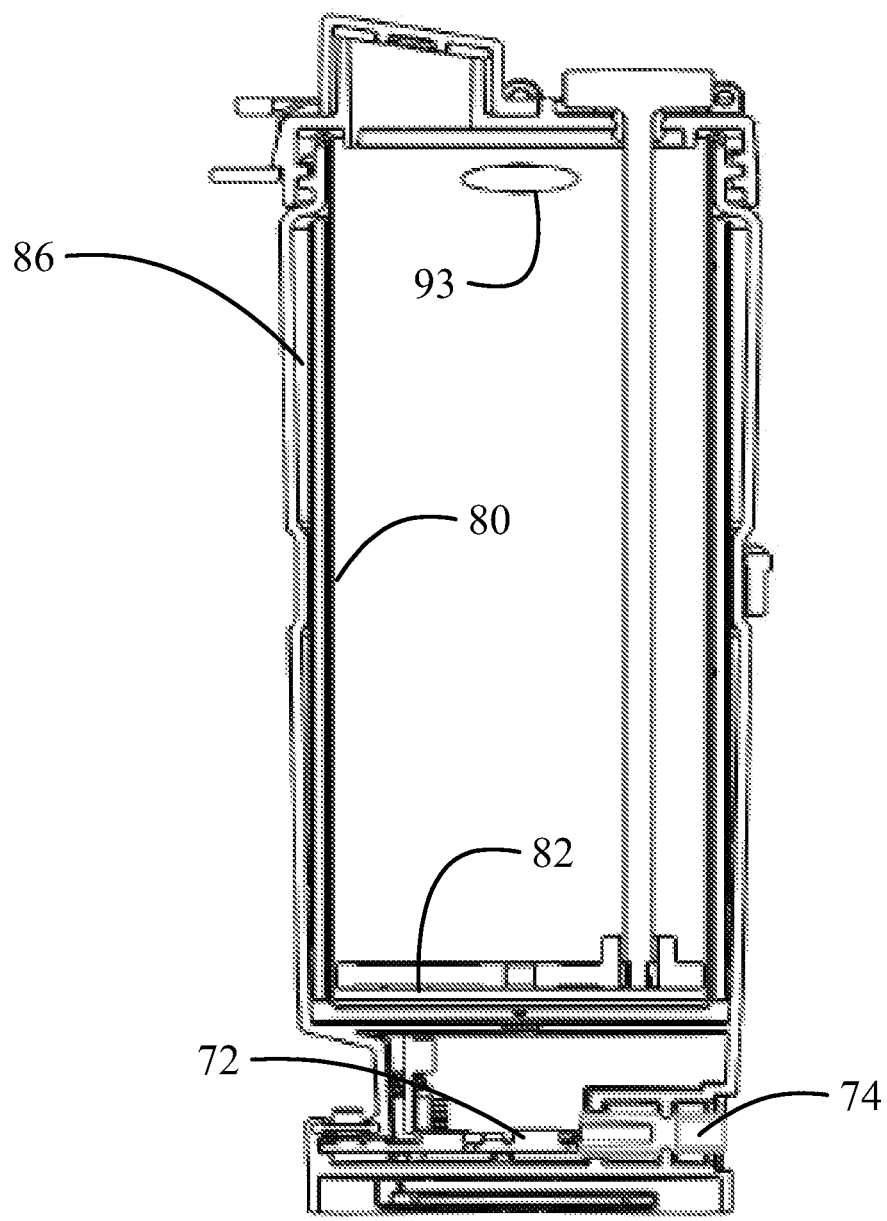
FIG. 4 is a side section view of the LCHS.
Figures 1, 12:
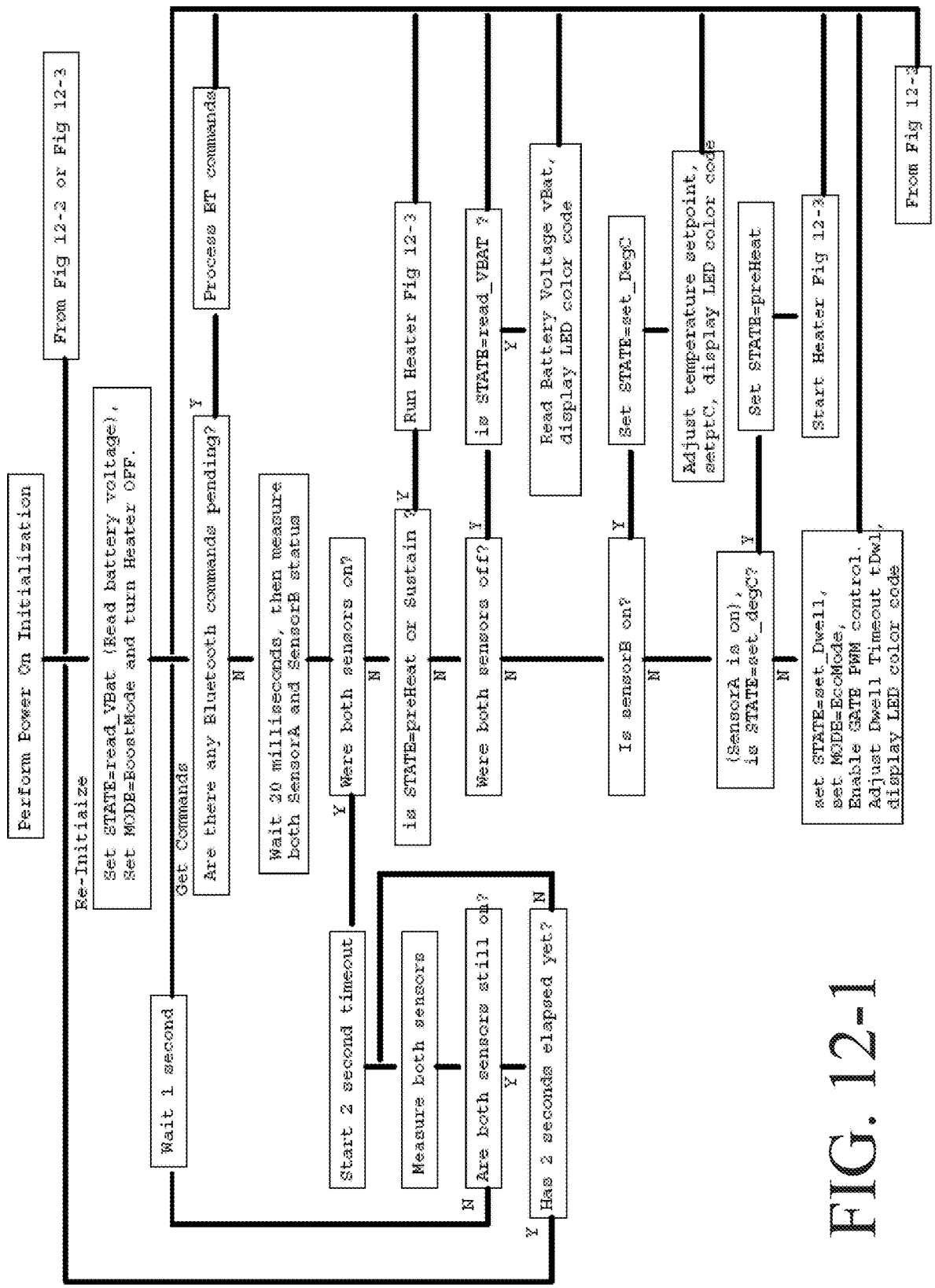
Figures 2, 12:
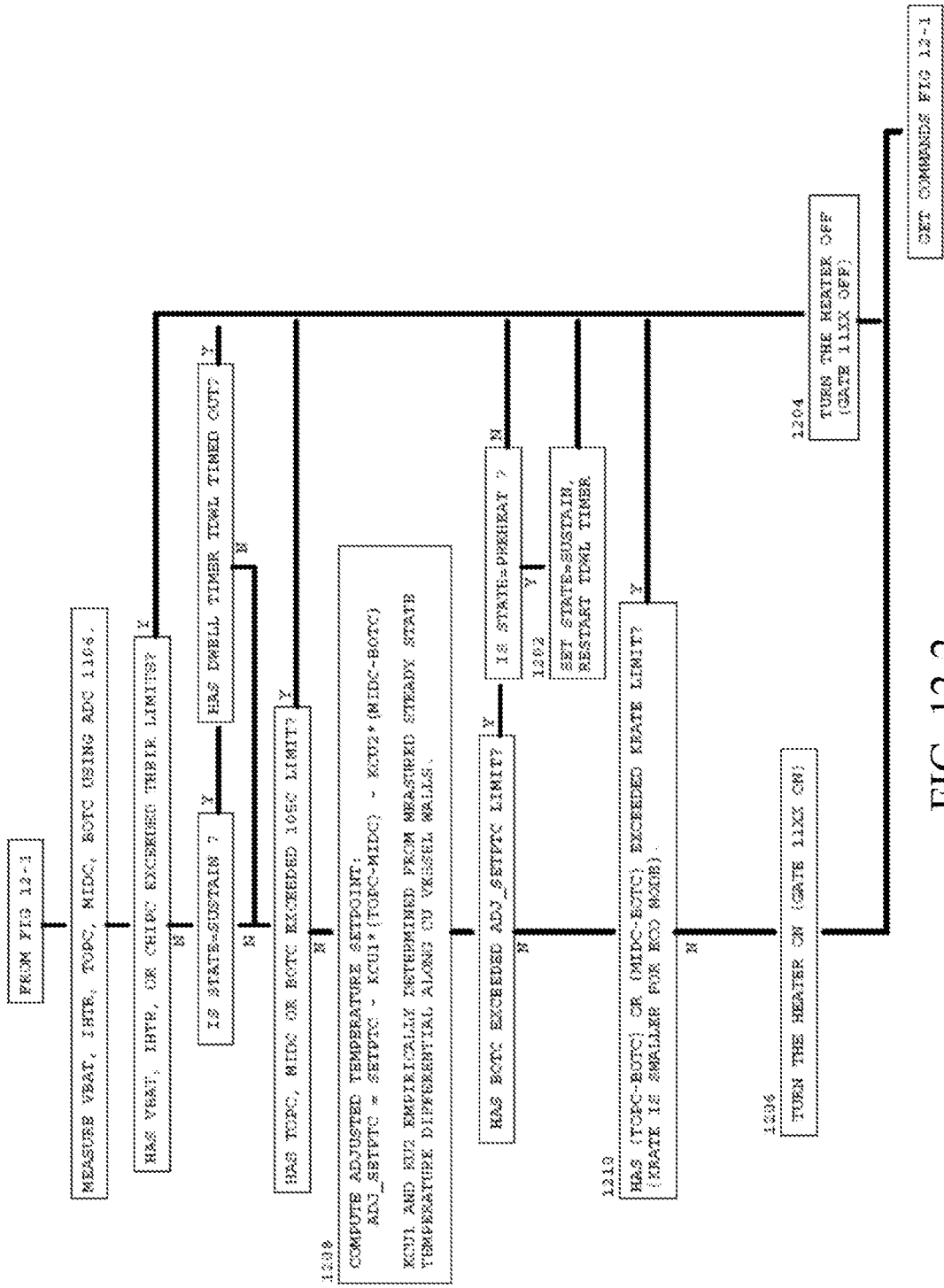
Figures 3, 12:
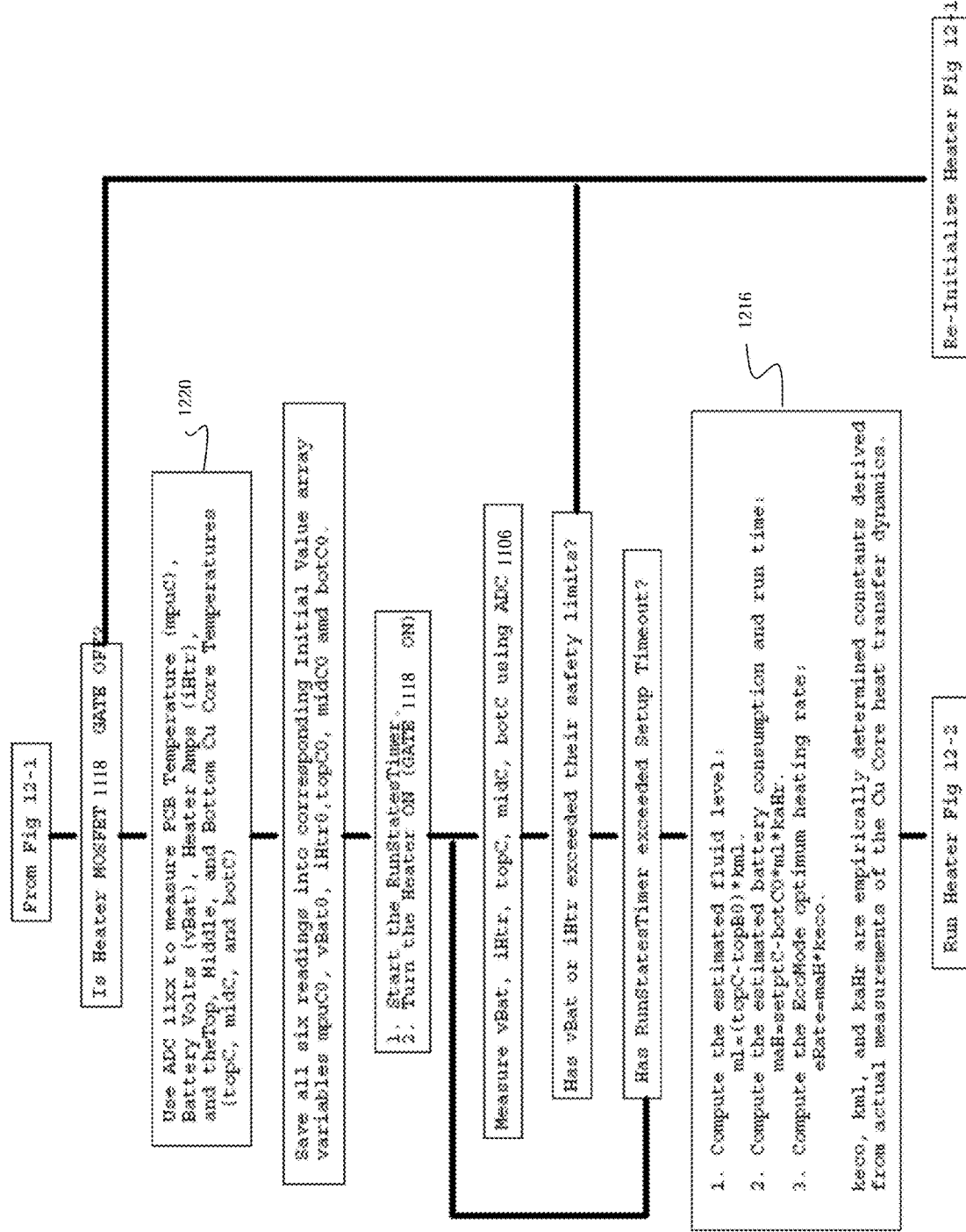

The LCHS 12 incorporates a copper core 80 having a solid bottom 82 to contain liquid carried in the first cylindrical shell 14 as seen in FIGS. 3 and 4. A multilayer Kapton™ heater and insulator 84 is concentrically wrapped around the copper core 80 in a compartment 86 between the copper heater core 80 and the first cylindrical shell 14. An adhesive backed Kapton™ etched foil heater with associated surrounding layers of aluminum foil, ceramic paper, aluminum foil, and shrink wrap (to be described in greater detail subsequently) are all attached to the sides of the copper core.

Figure 5A:
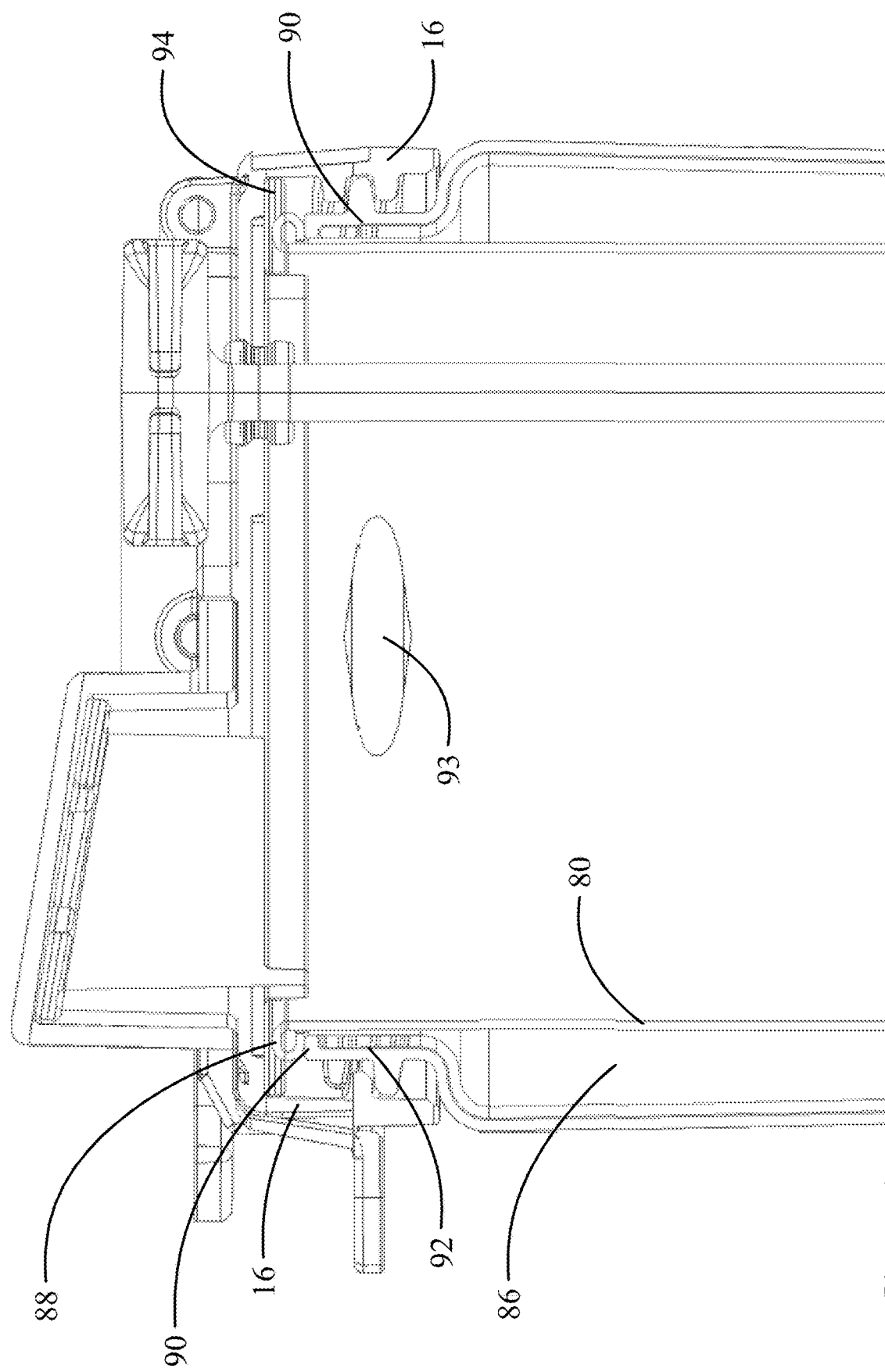
FIG. 5A is a detailed section view of the CU heater core engagement in the LCHS.
Figure 5B:
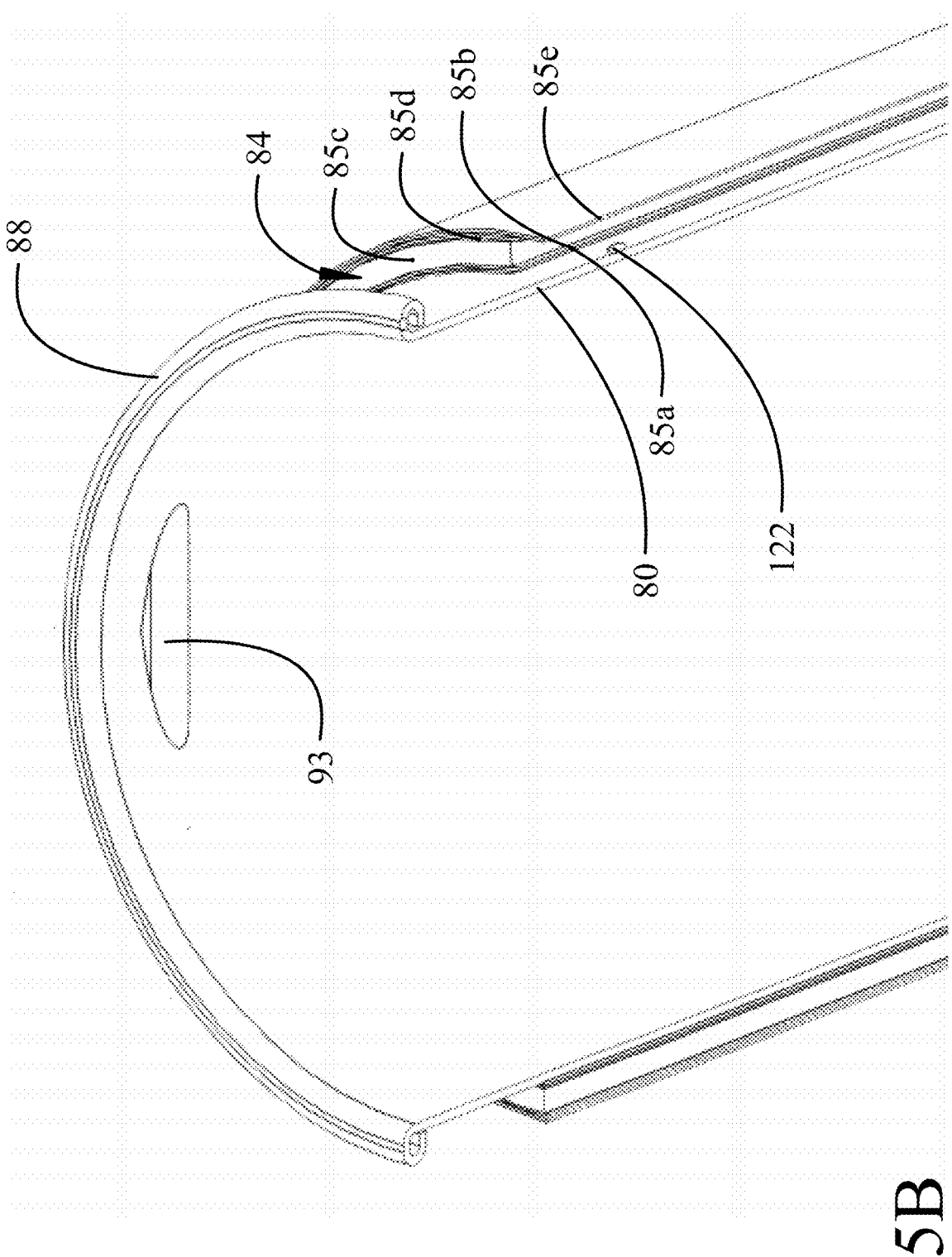
FIG. 5B is a further detailed section view of the foil heater and insulator installation around the heater core.

As seen in FIG. 5A, the copper core 80 has a curled lip 88 which is received on a top rim 90 of the first cylindrical shell 14. The first cylindrical shell 14 is bifurcated to allow the copper core 80 with the wrapped multilayer Kapton™ foil heater and insulator 84 in place to be inserted into a first half of the shell with a tight neck 92 terminating in the top rim 90. A second half of the shell is then engaged along the bifurcation line. The copper core hangs from the rim of the first cylindrical shell, further isolating the hot core from the plastic shell. The neck 92 is threaded to receive the cover 16. A gasket 94 in the cover 16 seals against the curled lip 88 of the copper core 80. FIG. 5B shows the details of the foil heater and insulator 84. A Kapton™ heater layer 85a is wrapped immediately adjacent the copper heater core 80 with an inner aluminum reflector 85b radially outward. A ceramic paper insulator 85c is the next radially outward layer with an outer aluminum reflector 85d wrapped outboard of the ceramic paper insulator. A shrink wrap seal 85e encapsulates the inner elements of the foil heater and insulator 84.

This configuration seals the heater compartment against water penetration which will cause the ceramic paper binder to dissolve. This is achieved by the compression gasket at the cover-shell rim and by the shrink wrap sealing the heater foil and insulation against the copper walls. A small opening 91 at the bottom of the heater compartment (seen in FIG. 3A) allows two heater and four thermistor wires to exit the compartment. Opening 91 is sealed with silicone sealant, as is the underside of the curled lip 88 to the top rim 90. The copper heater core 80 has two dents 93 near the curled lip 88. The dents 93 fit into two bosses 95 on the first cylindrical shell. The dents 93 prevent the copper core from moving up and down, and also prevent the copper core from rotating. Either motion would risk breaking the connecting wires and also expose the inside of the heating compartment to possible moisture contamination. The silicone sealant and the dents work together to keep the core from moving when frictional forces are exerted upon the copper heater core 80 as the cover gasket is screwed down tightly against the flared out copper core curled lip 88.

Figure 6:
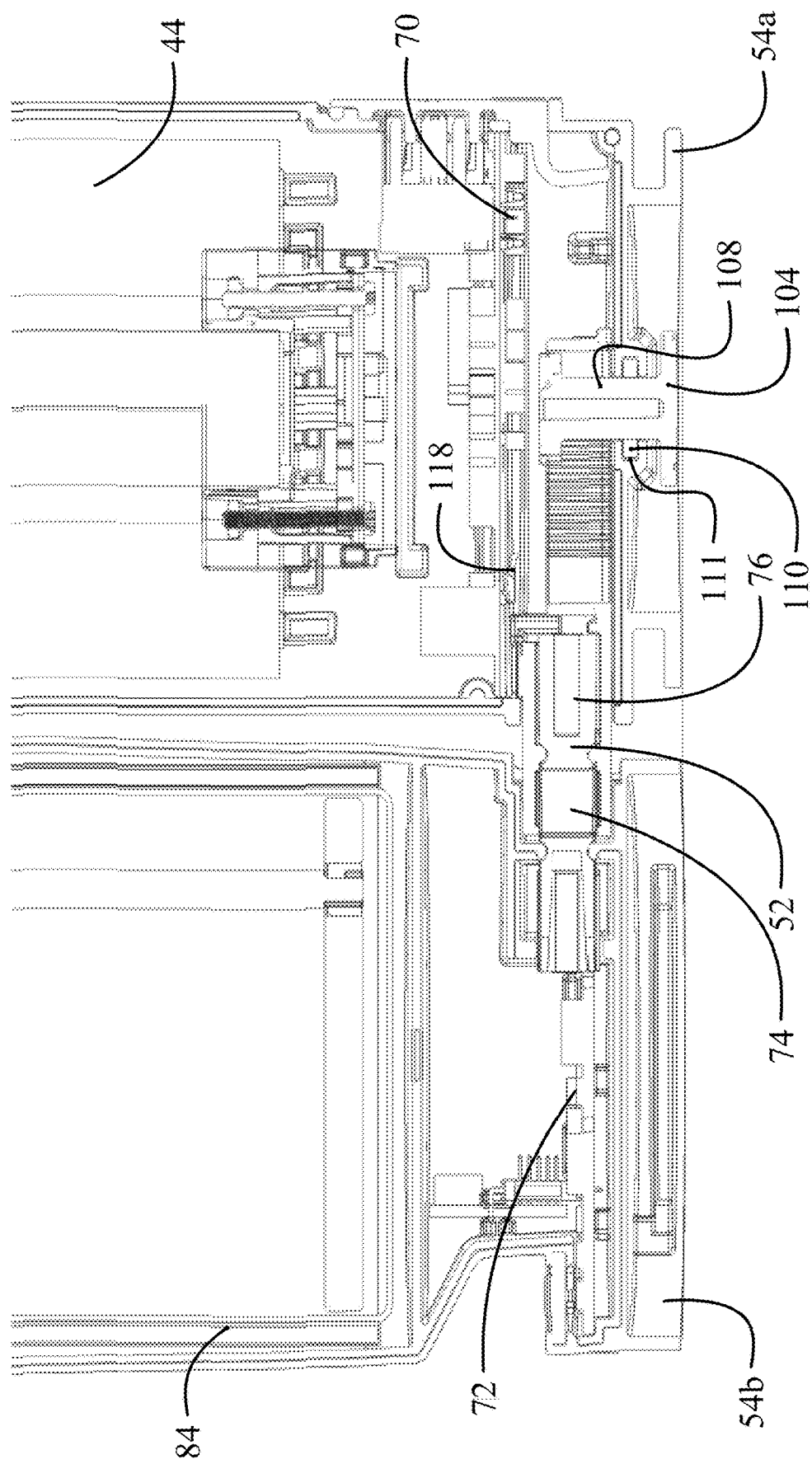
FIG. 6 is a detailed section view of the connection elements of the E-stove in the operating mode.
Figure 7A:
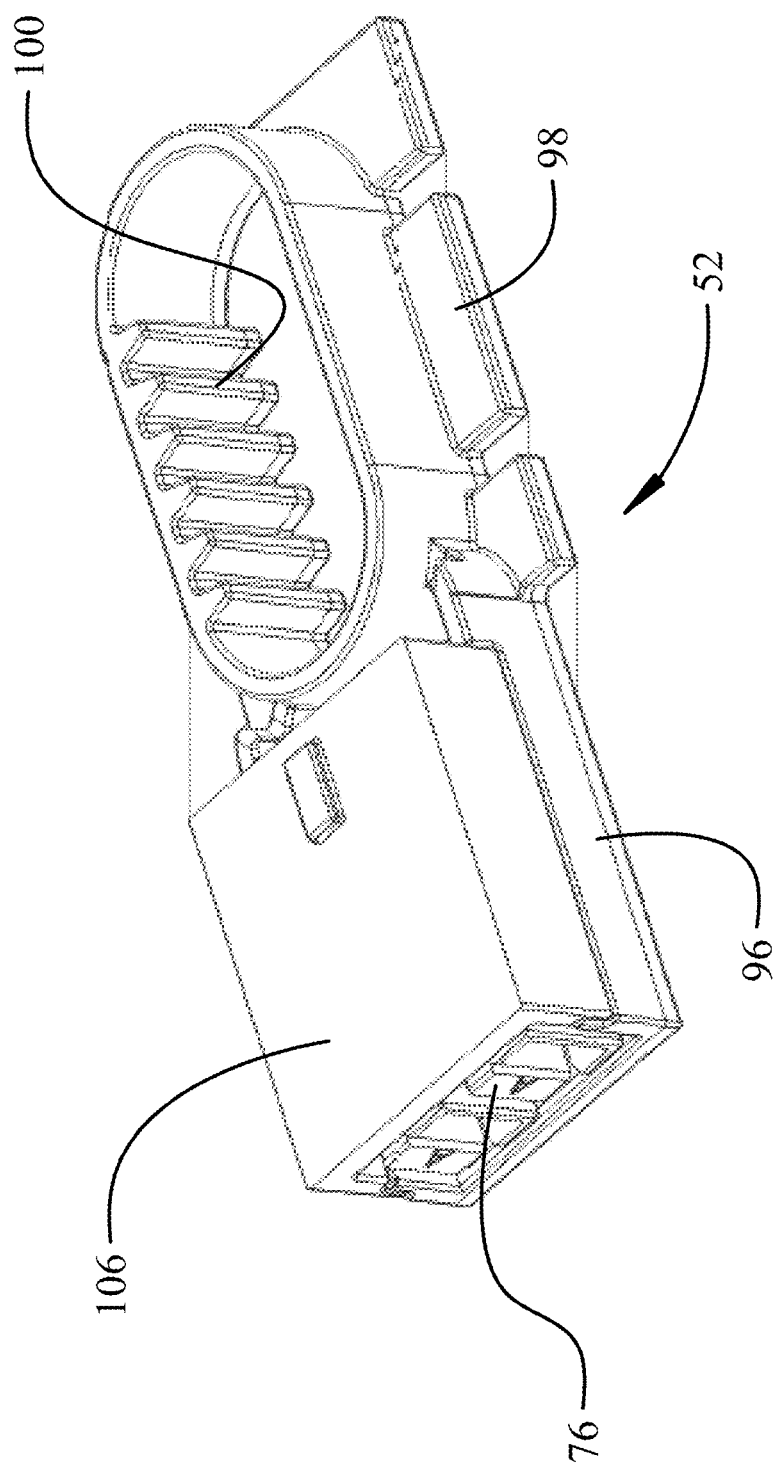
FIGS. 7A-7D are detail representations of the connector carriage in various positions.
Figure 7B:
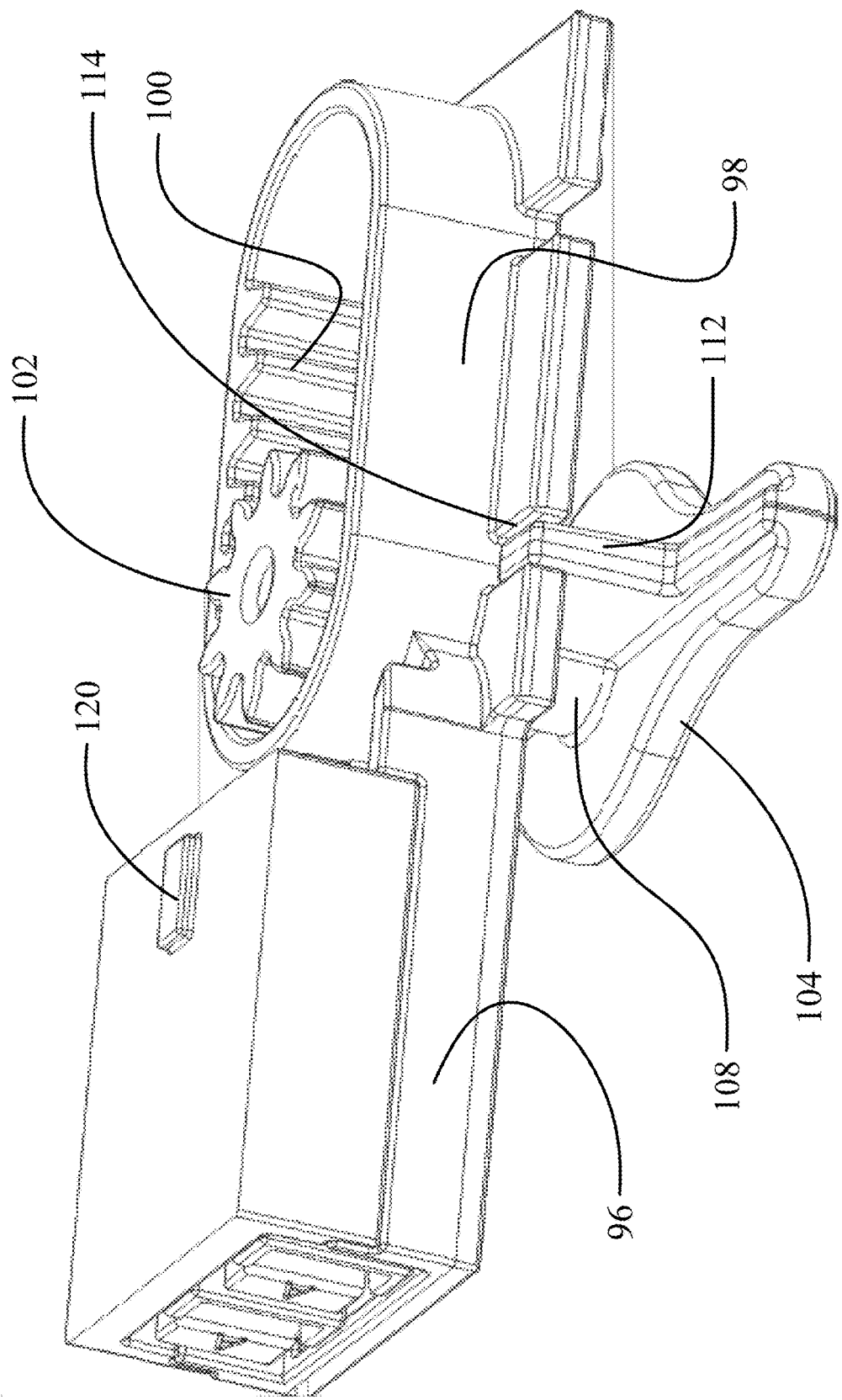
Figure 7C:
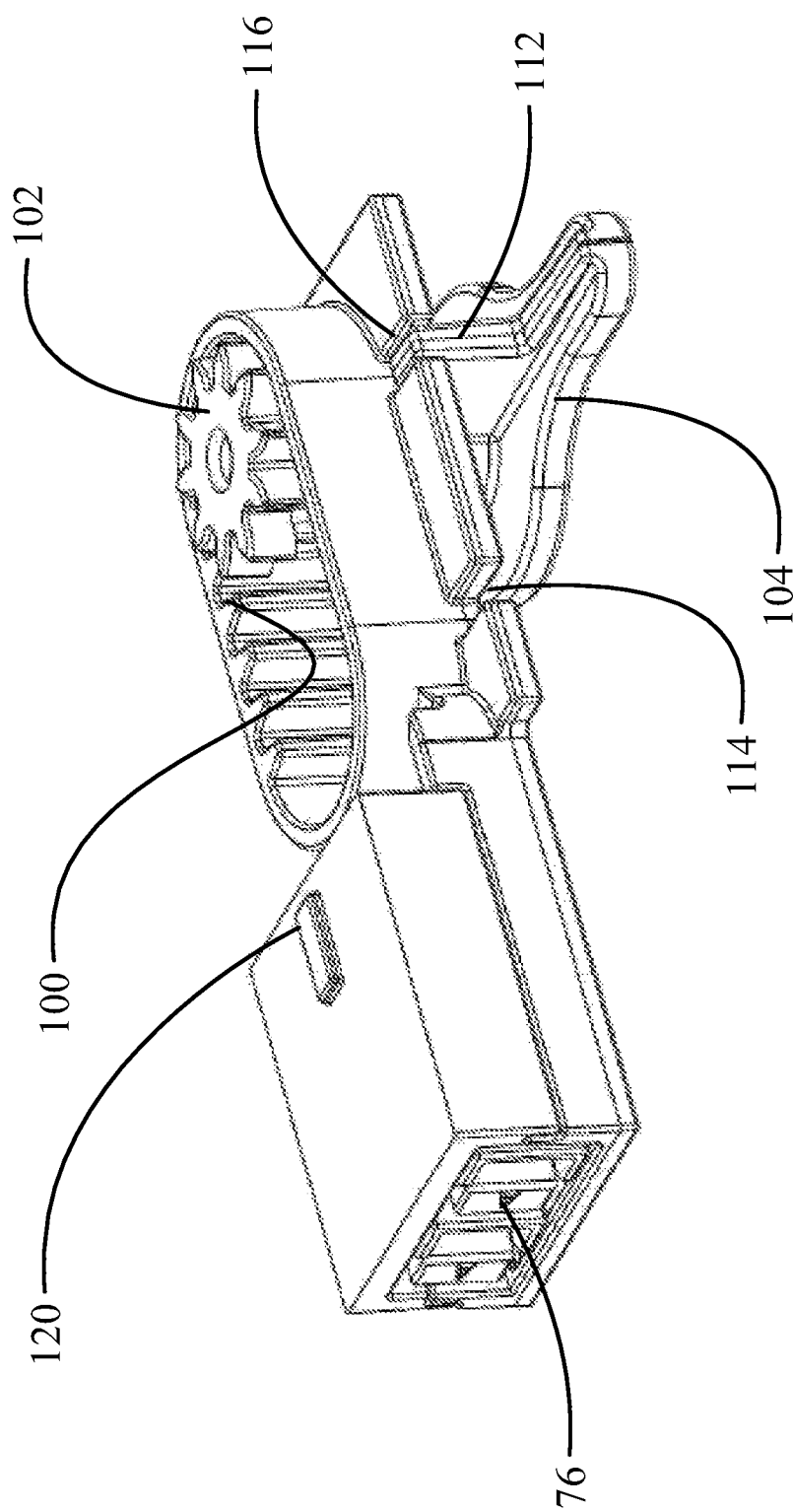
Figure 7D:
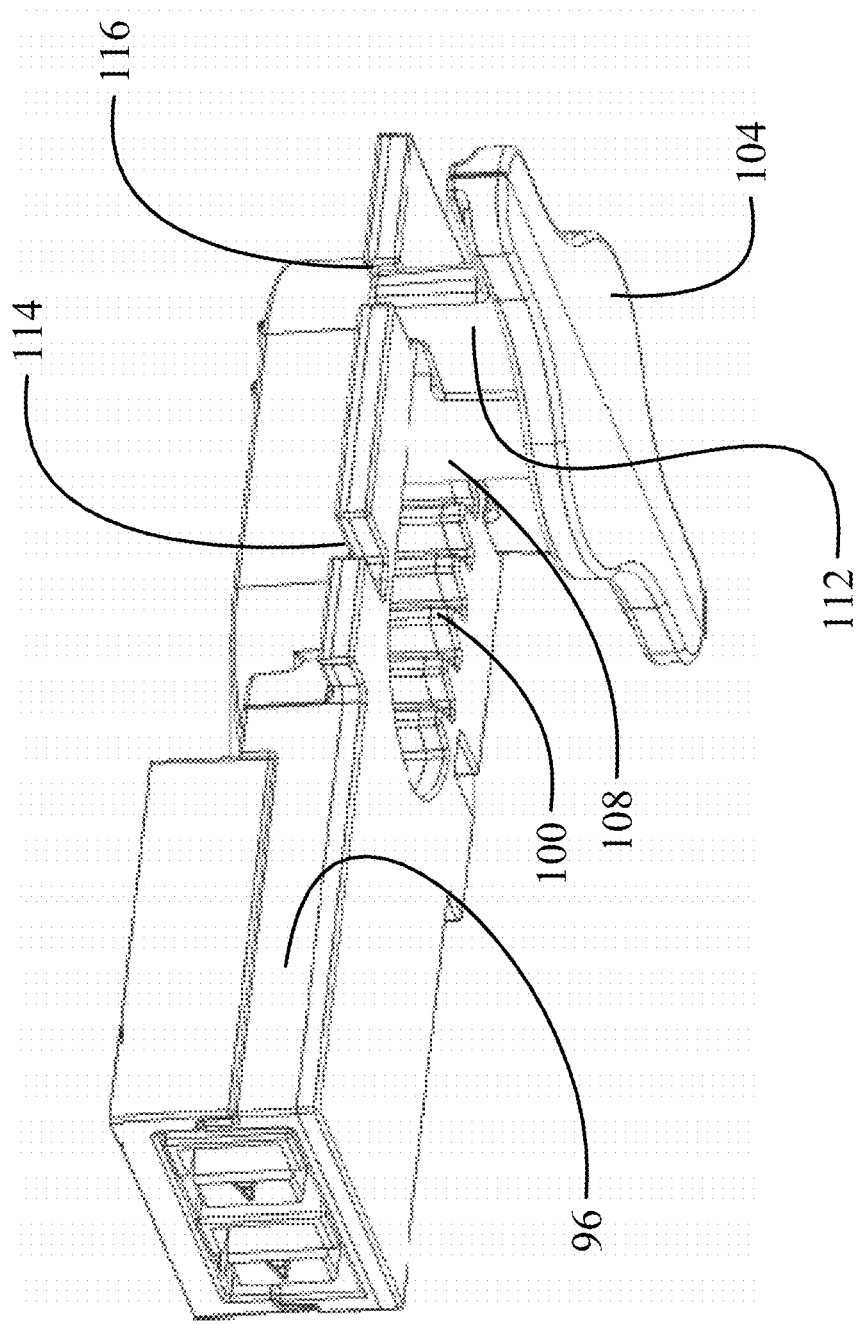
Figure 7E:
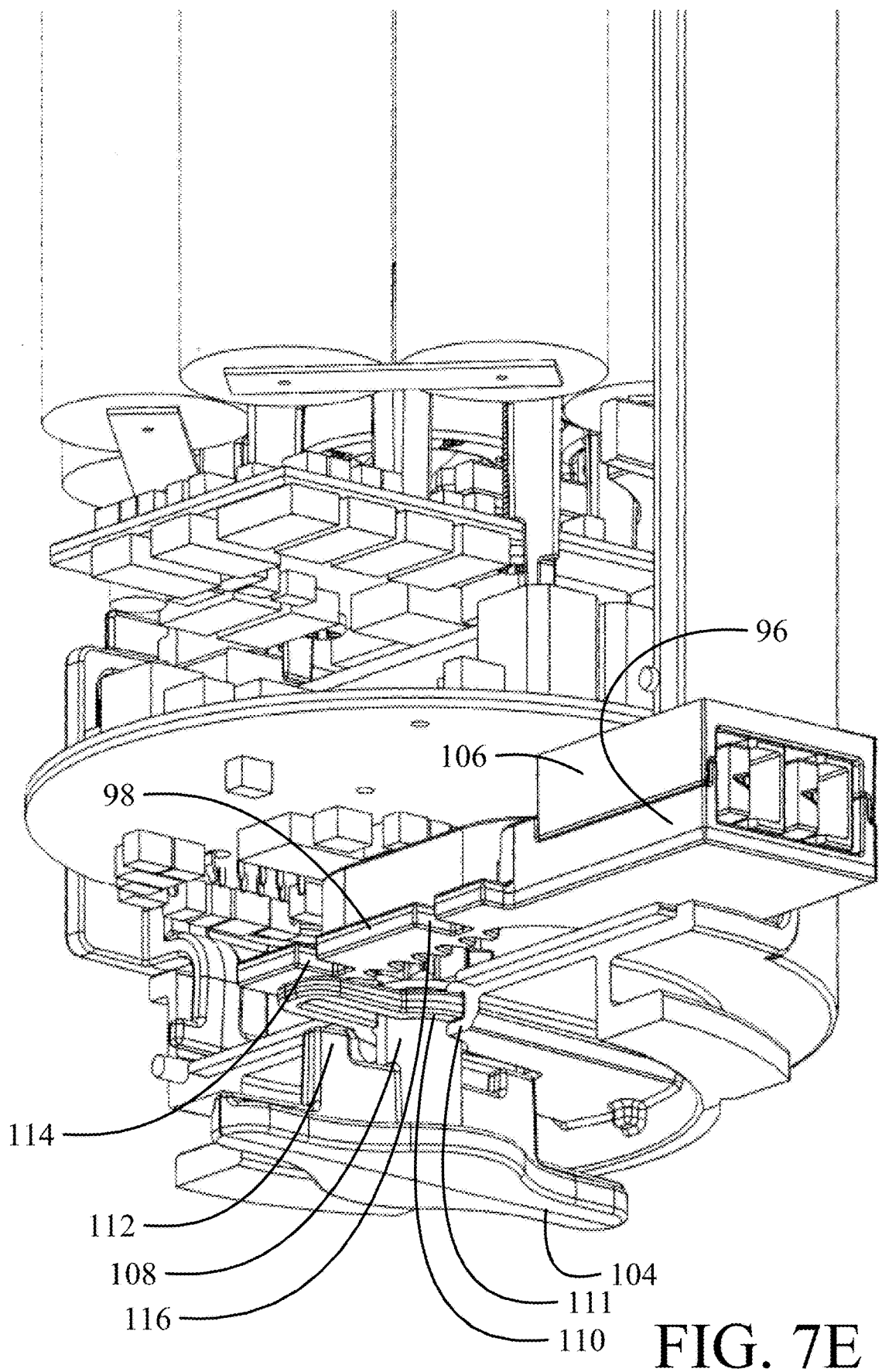
FIG. 7E is a detail representation of the connector carriage with the pinion handle in the extended unlocked position.

As seen in FIG. 6, the connector carriage 52 has a connector carrier 96 which is attached to a translation body 98, as shown in detail in FIGS. 7A-7D. The translation body 98 incorporates a rack 100 which is operatively engaged by a pinion 102. A rotating handle 104 extends from the pinion 102. A carriage top cover 106 secures the first contact set 76 of the connector to the connector carrier 96. The rotating handle 104 has a shaft 108 translatably carried in a pinion gasket 110 received in a collar 111 in the second cylindrical shell 42. The shaft 108 translates axially in the pinion gasket 110 between a first engaged position and a second locked position. In the locked position for the non-operating mode with the connector carriage 52 retracted (seen for example in FIG. 7B) tabs 112 on the handle 104 are received in retracted lock slots 114 in the translation body 98. In this position the connector carriage is locked in the retracted position and the handle 104 is restrained from rotation. The handle 104 is axially translated outward through pinion gasket 110 to withdraw the tabs 112 from the retracted lock slots 114 as shown in FIG. 7E allowing rotation of handle 104 and pinion 102 to drive the rack 100 to extend the connector carriage 52. Upon reaching the extended position as shown in FIGS. 7C and 7D, the handle 104 is axially translated inward engaging tabs 112 in extended lock slots 116 thereby locking the connector carriage 52 in the extended position to allow interconnection between the battery assembly 40 and LCHS 12 for the operating mode. The handle 104, handle shaft 108 and pinion gear 102 are configured such that, when the handle is fully pulled outwards, the locking tabs are beyond the recess in the bottom of the battery shell, allowing the handle to then freely rotate between the alternate locking positions. The pinion gear is larger than the shaft opening and prevents the handle from being pulled all the way out. Furthermore, the height of the pinion gear 102 (which is less than the height of the rack 100) remains engaged with the rack regardless of whether the handle is pulled out or is pushed in. The pinion gasket 110 in the collar 111 surrounding the pinion shaft 108 (and the engaging tabs 112 in the retracted position) provides a water resistant seal and enough friction to prevent the pinion shaft from falling out when the battery system 40 is manipulated.

A contact switch 118 (seen in FIG. 6) operationally disengages from a protrusion 120 on the carriage top cover 106 with the connector carriage 52 in the extended position. When engaged (with the carriage in the retracted position) the micro switch disables both the USB output and the charger input circuits on the battery system PCB, but it does not disable power from the battery pack 44 to the connector mounted in the carriage.

Figure 9:
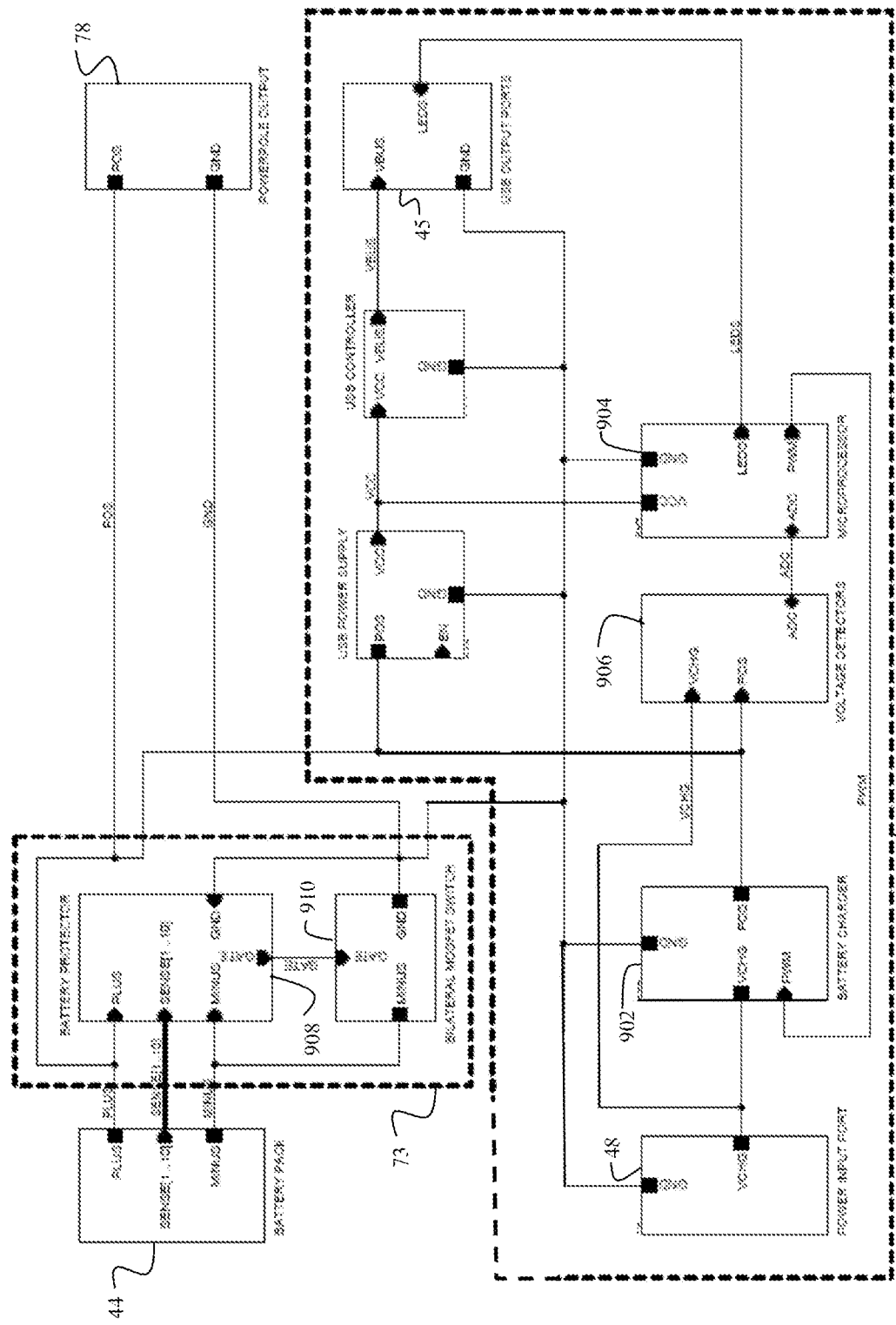
FIG. 9 is a block diagram of the power controller printed circuit board (PCPCB) elements.

As previously described, a universal power charger input jack 48 is provided for the battery assembly 40. The battery charger controller portion of the of the PCPCB 70 employs a boost converter 902 as shown in FIG. 9 which, for the exemplary implementation, is based upon the TI LM5022 boost converter topology. A microprocessor based enhancement described with respect to FIG. 10 allows the boost converter's standard maximum current control circuitry to be over-ridden by a microprocessor 904 based upon the observed input voltage measured by a voltage sensor 906 and subsequent behavior of the input voltage under load.

Any form of DC source that can provide input voltages in the range from 9 VDC to 24 VDC may be connected to the universal power charger input jack 48, step 1001. The four primary example sources are a stiff, fixed voltage source (example: car nominal 12V power port), a current limiting DC voltage source (examples: wall plug power supply or bench power supply), a current limiting DC source (example: solar cell array), or a raw half rectified AC source (example: simple 50/60 Hz mains transformer).

The microprocessor initially reads the connector carriage sensor switch 118 to determine if the carriage is in the extended position, step 1002, and, if so, a charger 902, analog to digital converter (ADC) 906 and the microprocessor 904 circuits are turned on, step 1003. The initial charging current PWM is set to zero, step 1004. The ADC voltage detector circuit 906 is read to determine the open circuit VCHG voltage source and stores that value in a register, step 1005. The microprocessor ignores DC voltages below 9 VDC or over 24 VDC and returns to step 1001. When the microprocessor detects a voltage between 9 VDC and 24 VDC, step 1006, internal status flags are set based upon the measured value, step 1008. If the voltage is below 18.5V when first measured (at zero current load), the microprocessor assumes a current limited constant voltage source, step 1010. If the voltage is above that level, the microprocessor assumes the source is a constant current source (i.e. solar source), step 1012. These initial assumptions will be overridden if the subsequent behavior is inconsistent with the first guess.

Once the initial setup phase is completed, the microprocessor resets then starts a one minute timer counter, step 1013. A previous value of VCHG voltage source voltage is stored, step 1014, and the ADC reads and updates the VCGH voltage source voltage value, step 1015. If the voltage is less than a shutdown limit the cycle returns to step 1001. If not, a determination is made if the voltage is less than the previous stored voltage and, if so, reduces the current limit setting PWM by a predetermined decrement, step 1016. A determination is then made if the one minute timer counter has timed out and, if not, returns to step 1014. If so, the cycle returns to step 1001. If the determination that the voltage is less than the previous stored voltage is no, a determination is made if the voltage is greater than the previous stored voltage. If so, the current limit setting PWM is then incremented to increase the current drawn from the source but not more than the maximum limit that the boost converter allows, step 1017 (this is set at the factory and based upon the battery cell amp-hr rating). As the current increases, the voltage at the external power source will remain almost constant, and then begin to droop. This method provides a determination of the source type. If the source has a straightforward current overload limit, the voltage will drop abruptly. If the source has a soft (fold back) current limit, the voltage will drop more slowly. Either way, the voltage drops, and the microprocessor determines the source current limit has been exceeded. The microprocessor reduces the requested current by a few steps, and repeats observation. Once the source current limit has been reached, the microprocessor stops dithering and stays at the calculated operating point for approximately 1 minute after which it repeats the process until the battery pack 44 eventually reaches its full charge voltage of 38.6V (which is also dependent upon battery cell selected, and set at the factory). Thereafter, the battery is effectively trickle charged until the external source is removed.

A selected solar source will output a voltage near 20V and that voltage will drop as more current is demanded by the micro. However, the solar cells voltage/current behavior is different from the other sources listed in that it has a very soft characteristic, i.e., the voltage drops much more for a given increase in load. The microprocessor therefore uses a more relaxed criterion for determining when and if it needs to limit the solar source load. The operating system set point also changes with solar flux, which can change within the one-minute sampling interval. If the operating point changes significantly, the microprocessor terminates the current interval and begins a new dynamic control interval.

Figure 11:
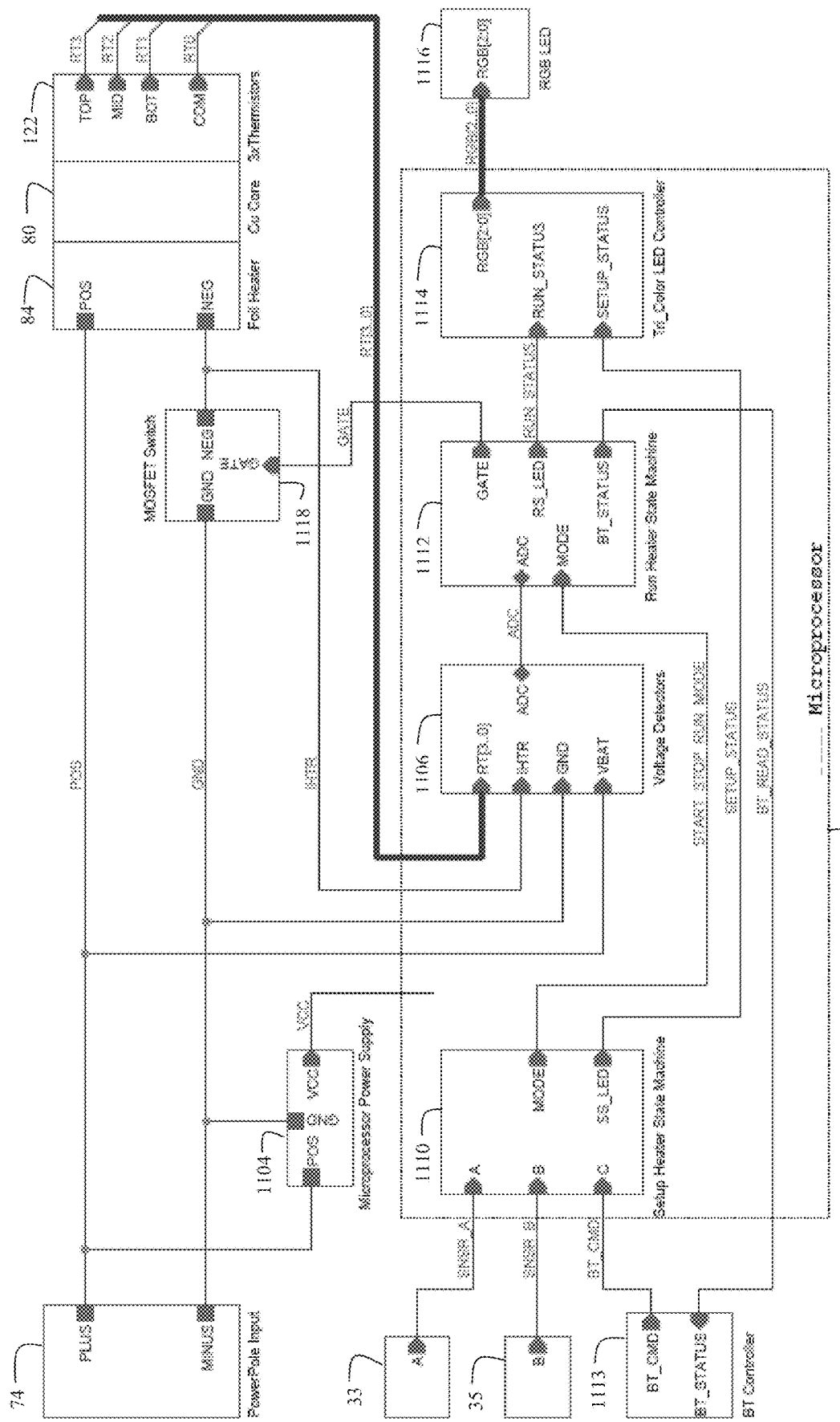
FIG. 11 is a block diagram of the heater control PCB.

As seen in FIG. 11 and described with respect to FIG. 12 the foil heater is entirely controlled by a second microprocessor 1102 on the heater control PCB that receives power from the connector 74 from the battery system 40. A microprocessor power supply 1104 steps down voltage for the second microprocessor 1102. The second microprocessor measures the voltages and load current including the wall temperatures of the copper core with thermistors 122 at the bottom of the core, half way up the core wall, and near the top of the core wall (seen in FIG. 5B), and the ambient temperature at the microprocessor chip with voltage detectors 1106. The second microprocessor employs a first state machine 1110 for heater setup and a second state machine 1112 for heater operation. A tri-color LED controller 1114 provides signaling output to a RGB LED 1116 located behind the membrane in the control and indicator panel 34 as previously described. A MOSFET switch 1118 provides master "on-off" control of current to the foil heater 85a.

The second microprocessor employs the two control buttons 33 and 35 in the indicator panel 34 that are used to set the target fluid temperature, the rate at which the heater power will be increased, and the dwell time once the target temperature has been reached before completely shutting down the heaters through the first state machine as shown in FIG. 12-1. Once the initial setup is completed, the buttons are then used to start the heater cycle and to manually stop (reset) the cycle. Alternatively, a BlueTooth™ controller 1113 may be employed for input. The heater PCB contains a plug-in Bluetooth remote control board 1108 capable of accessing the second microprocessor measurements and setting the second microprocessor operating parameters. This extends the foil heater functionality to the full processing power of modern cell phone operating systems. However, given the intended application (outdoors), the system will always require the manual controls described above since one cannot assume an operating cell phone is always present.

The second microprocessor implements two processing modules in the second state machine 1112, the eco mode and the boost mode, as shown in FIG. 12-2.

The boost mode simply provides power to the foil heater and measures all three thermistors 122 and the voltage of the battery pack 44. The boost mode enters a dwell phase once the bottom thermistor reaches the target temperature, step 1202. The heater is also turned off if any thermistor reaches 105C or the battery pack condition is below its shutdown limits step 1204. Assuming the battery pack is within acceptable limits, the heaters are turned back on once all thermistors readings have dropped a few degrees, step 1206.

The eco mode measures all three thermistors and the battery condition, and computes a temperature set point, step 1208. It will enter the dwell phase once the bottom thermistor reaches a target temperature, step 1210. It will increase heater power if the bottom thermistor is below the target temperature, step 1211 and decrease the heater power if the bottom thermistor is above target temperature, step 1212. The limits are chosen to optimize the thermal performance of the overall foil heater system and are based upon observed foil heater thermal performance under varying conditions, including the initial fluid starting temperature, computed estimated initial fluid volume, and the ambient temperature as shown in FIG. 12-3. The second microprocessor detects ambient temperature by measuring its chip temperature, and the initial fluid temperature by measuring the bottom thermistor, step 1220. The second microprocessor can also estimate the amount of fluid in the copper heating core, by observing the differential temperature between the three thermistors shortly into the heater cycle, step 1216. All of these measurements are used in the eco mode to optimize the conversion of the battery energy used to heat the fluid, and to estimate the battery energy requirement to meet the intended target temperature (and the corresponding time to reach the target temperature).

The overall objective is to increase the total volume of heated fluid that can be achieved with a fresh battery as much as physically possible. Eco mode trades heating time to achieve this objective. Boost mode minimizes heating time at the expense of greater battery consumption.

Referring again to FIG. 9, the battery system 40 is fully protected by the BPPCB 73 attached to the bottom battery spacer by a control chip 908. In an exemplary implementation, a TI BQ77905 chip is employed on the BPPCB as the control chip, in its published standard reference circuit to measure all 9 cell voltages and the current into and out of the battery, and subsequently turn off MOSFET switches 910 to disconnect the output power connector (in the carriage) upon a detected overload or failure event. Additional protection is provided by the recessed contacts in the Anderson PowerPole connectors employed in the exemplary embodiment, the retraction of the entire connector within the battery, and lastly, the rubber plug 60 that swings over and pushes in to cover the carriage opening. Both plugs 60 and 62 pull out and swing over to the right in their operate mode, i.e. in opposite relative directions when facing each other, to avoid interference.

Figure 8A:
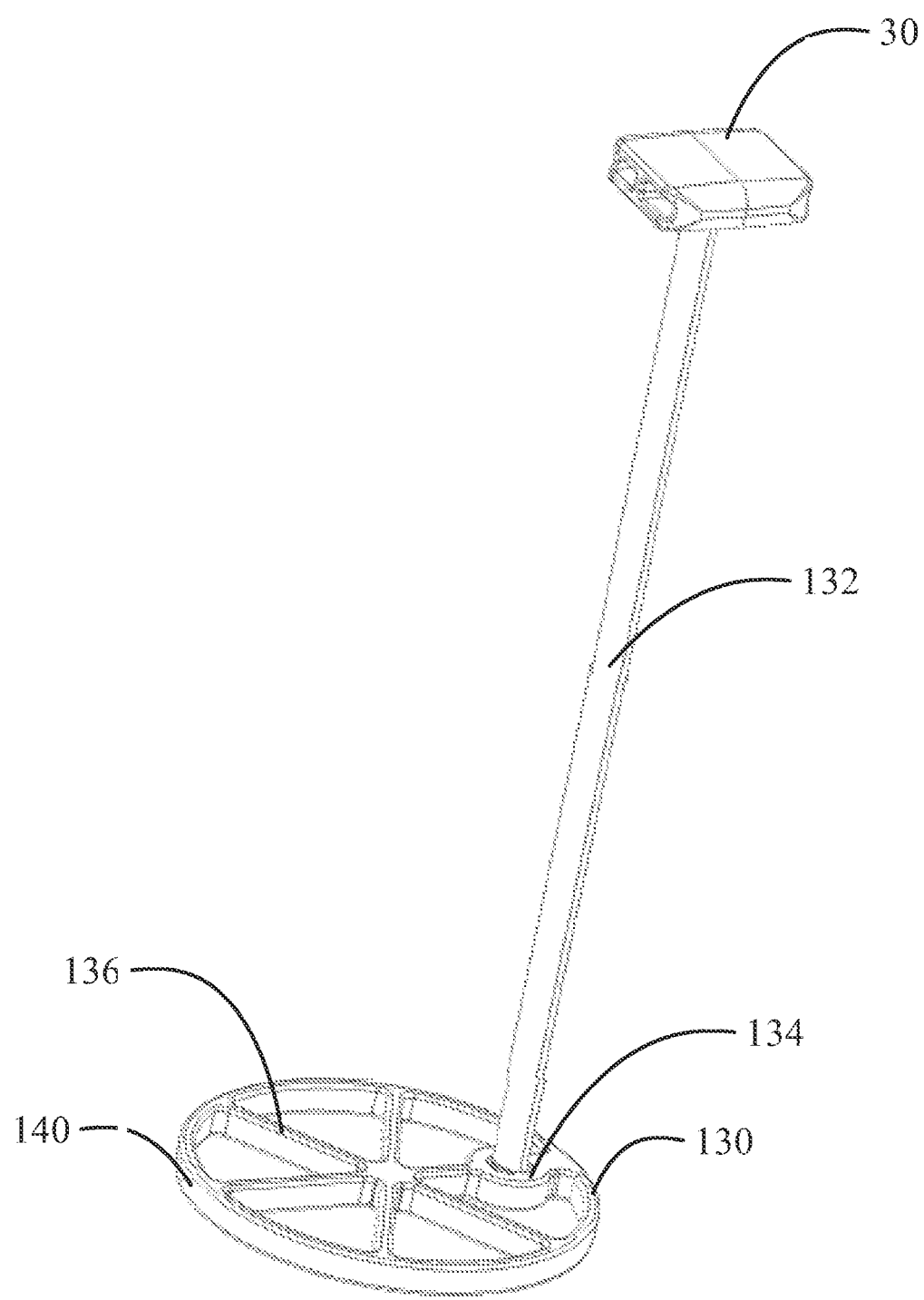
FIG. 8A is a pictorial representation of the stirrer.
Figure 8B:
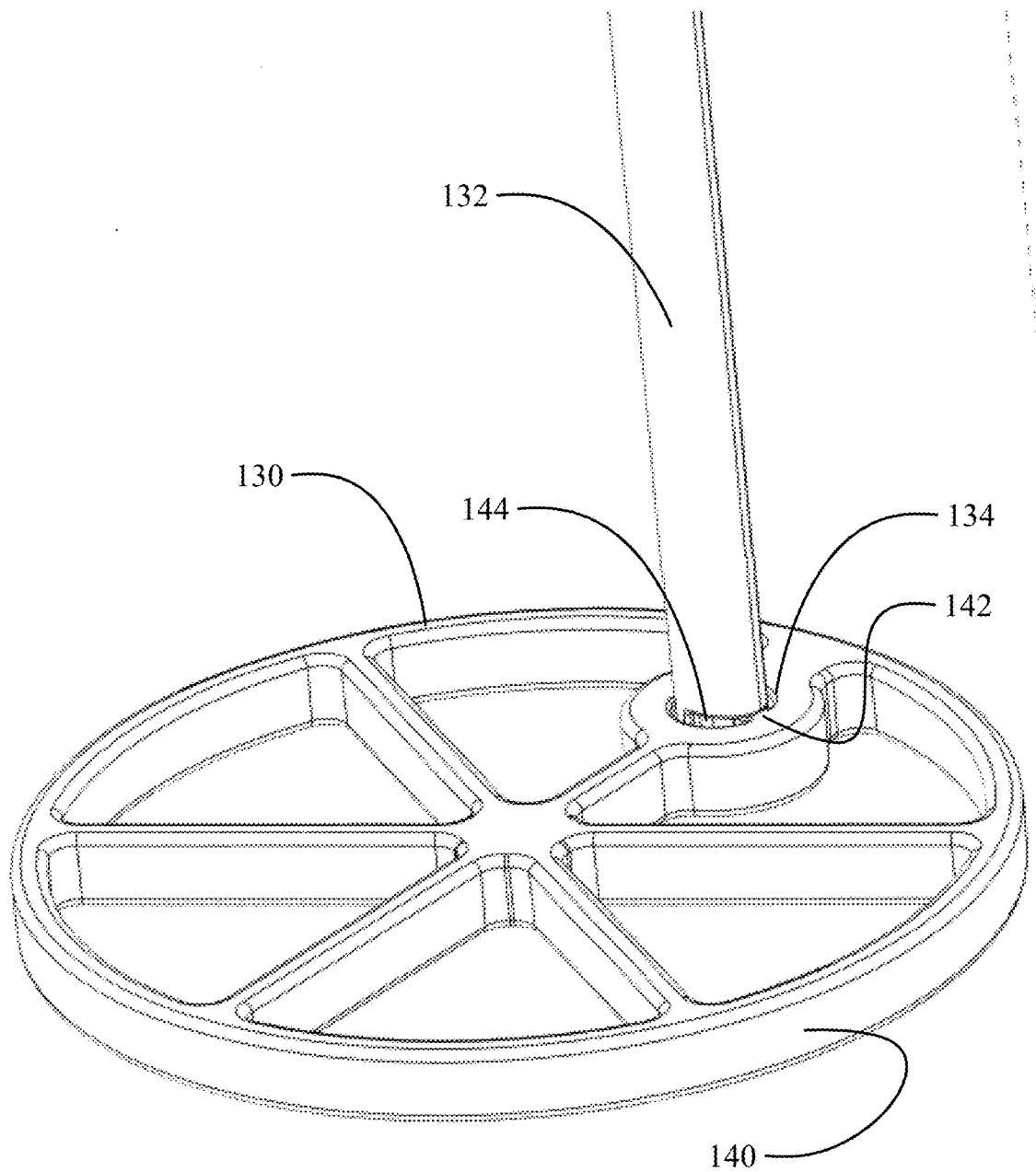
FIG. 8B is a detailed representation of the rod and vanes interface in the stirrer.

Referring to FIG. 8, a stirrer 130 is concentrically received in the copper heater core 80. The handle 30 permanently attaches to an oval shaft 132, which in turn attaches to the stirrer 130 in a twist lock scheme. The shaft is inserted into a circular receptacle 134 in vanes 136 in the stirrer 130 after the shaft passes thru an oval cover grommet 138 (seen in FIG. 5A). The vanes are then rotated 90 degrees, which aligns an outer wheel 140 with the copper heater core walls and orients a pair of opposing detents 142 in a circular groove 144 in the oval profile of handle 30. Once in this position, the vanes cannot come off since the vanes to shaft connection cannot become unlocked with the detents retained in the groove and the outer wheel retained in the cylindrical copper heater core. The walls of the cylinder prevent the vanes from rotating the requisite opposite 90 degrees. Furthermore, the vane walls remain concentric as the cover rotates, keeping the vanes locked on. The shaft is oval because a round shaft could rotate and disengage the vanes. The oval shaft cannot rotate and thus all mechanical connections remain locked. The stirrer is activated by pushing/pulling the handle up and down, causing the vanes to traverse very close to, and parallel to, the walls. The corresponding turbulence dislodges bubbles formed on the copper heater core walls, which still have room to move up the wall and coalesce, creating more turbulence. Removing the boundary layer bubbles off the vertical walls of the copper heater core greatly reduces the heating time and avoids the extra losses associated with overheating the copper heater core walls.

The disclosed implementations provide benefits including almost goof-proof connection (cannot be connected backwards), extremely good contact wiping ability, and the use of a parallel battery system/LCHS configuration which maximizes backpack storage options and stabilizes the operating stove against wind gusts (an improvement over having the heating source below the vessel which then must mount above it and use either tripod legs or the stove windshield to hold the pan). The standard arrangement puts the center of gravity much higher up than the present side mount scheme, and thus, it is less stable. The ability to merely physically separate the LCHS and battery system provides an added safety feature of instant off with disconnection of the connector. As noted, the diameter of the LCHS is adapted to fit a backpack water bottle pocket. However, both the LCHS and battery assembly may be configured with a cylindrical form factor to fit a standard vehicle cup holder. The axially connected configuration in the non-operating mode provides a method to position the battery (upside down) below the stove while securely holding both in place in a cup holder so the battery assembly can optionally be recharged by plugging its power input jack into a vehicle power port source and/or also optionally power the stove (using a small jumper cable accessory to connect the battery power output port to the stove power input port, which are both exposed when installed in a cup holder in this described manner). Once the copper heater core of the LCHS reaches temperature, the short jumper cable can be removed and the LCHS can be unscrewed from the battery assembly. The battery assembly can optionally remain held in the holder until the battery fully recharges. The LCHS can be re-stored on top of the battery assembly, or the battery assembly can be removed and the LCHS stored directly into the cup holder without any cables remaining attached where the LCHS will function in a manner similar to a thermos bottle and keep the fluid near the target temperature for several hours. This functionality enables the product to address both backpack centric and vehicle centric uses. The vehicle centric use might employ and implementation with a LCHS having approximately 5 inch height and 350 ml capacity to provide a faster and more stable configuration targeting this specific cup holder market. Such a version would have exactly the same construction except the heater power would be one half of the larger version and the copper heater core would be half as high.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. An electronic stove comprising:
    a liquid container and heater system (LCHS) having
        a substantially cylindrical outer shell;
        a copper heater core concentrically received in the outer shell,
        a foil heater concentrically received around the copper heater core;
        a heater control PCB carried in the outer shell and operationally connected to the foil heater;
    a battery assembly having
        a substantially cylindrical second outer shell;
        a battery pack carried within the second shell;
        a power controller printed circuit board carried in the second outer shell and operationally connected to the battery pack;
    a connector carriage, extendable from the battery assembly proximate a lower surface second outer shell and adapted to be engaged between the battery assembly and the liquid container and heating system in an operating mode, the connector carriage removably extending through a first aperture in the second cylindrical shell of the battery assembly and received through a second aperture in the first cylindrical shell of the liquid container and heating system, said second aperture proximate a lower surface of the first outer shell and aligned with the first aperture whereby the lower surface of the first outer shell and lower surface of the second outer shell are in planar alignment;
    a first contact set of a connector, said first contact set carried by and operationally connected to the heater control PCB;
    a second contact set of the connector, said second contact set carried by the connector carriage and operationally connected to the power controller printed circuit board.

2. The electronic stove as defined in claim 1 wherein the LCHS and battery system are separable in a non-operating mode and said connector carriage is retractable into the second outer shell.

3. The electronic stove as defined in claim 2 wherein the connector carriage further comprises:
    a connector carrier attached to a translation body, the translation body having a rack which is operatively engaged by a pinion;
    a rotating handle extending from the pinion;
    a shaft translatably carried in a pinion gasket received in a collar in the second cylindrical shell, the shaft translatable axially in the pinion gasket between a first engaged position of the pinon and rack and a second locked position, in the locked position for the non-operating mode with the connector carriage retracted, tabs on the handle are received in retracted lock slots in the translation body, locking the connector carriage in the retracted position and the handle is restrained from rotation, the handle axially translatable outward through pinion gasket to withdraw the tabs from the retracted lock slots allowing rotation of handle and pinion to drive the rack to extend the connector carriage, upon reaching the extended position, the handle is axially translatable inward engaging the tabs in extended lock slots thereby locking the connector carriage in the extended position to allow interconnection between the battery assembly and LCHS for the operating mode.

4. The electronic stove as defined in claim 3, further comprising;
    a USB power port carried in the second shell and operationally connectable to the battery pack;
    a universal charger input carried in the second shell and operationally connectable to the battery pack;
    a switch operationally contacting the connector carrier in the retracted position and adapted to disable both the USB output and the charger input circuits on the battery system PCB, but not disabling power from the battery pack to the first connector element mounted in the carriage.

5. The electronic stove as defined in claim 2 wherein the LCHS has a circumference adapted to be received in a backpack water container pouch or a vehicle cup holder.

6. The electronic stove as defined in claim 1 wherein the first outer shell further incorporates a first connector moiety of a rotatable connector and the second outer shell further incorporates a second connector moiety of the rotatable connector whereby the first and second outer shells may be axially aligned and joined by the rotating connector in a non-operating mode.

7. The electronic stove as defined in claim 1 wherein the foil heater comprises:
    a heater layer wrapped immediately adjacent the copper heater core;
    an inner aluminum reflector radially outward of the heater layer;
    a ceramic paper insulator radially outward from the inner aluminum reflector;
    an outer aluminum reflector wrapped outboard of the ceramic paper insulator; and
    a shrink wrap seal encapsulating the heater layer, inner aluminum reflector, ceramic paper insulator and outer aluminum reflector.

8. The electronic stove as defined in claim 1 wherein the copper core has a curled lip received on a top rim of the first cylindrical shell, the first cylindrical shell bifurcated to receive the copper core and foil heater and insulator into a first half of the shell with a neck terminating in the top rim and a second half of the shell engaged along a bifurcation line, whereby the copper core hangs from the top rim of the first cylindrical shell, the neck threaded to receive a cover, a gasket in the cover sealing against the curled lip of the copper core.

9. The electronic stove as defined in claim 8 wherein the cover comprises:
- a flip cap rotatable about a first hinge;
- a carabiner clip rotatable about a second hinge, whereby in a closed position the carabiner clip overlays the flip cap and legs of the carabiner clip are engaged in detents locking the carabiner clip and flip cap in the closed position.

10. The electronic stove as defined in claim 9 further comprising a stirrer concentrically received in the copper heater core, said stirrer having a handle permanently attached to an oval shaft, said shaft inserted into a circular receptacle in vanes after passing through an oval cover grommet, said vanes rotatable 90 degrees to align an outer wheel with the copper heater core wall and orient a pair of opposing detents in a circular groove in the oval profile of handle, said stirrer reciprocatable along the inner surface of the heater core to disrupt vapor bubbles.

\* \* \* \* \*